(12) United States Patent
Milster et al.

(10) Patent No.: US 7,916,291 B2
(45) Date of Patent: Mar. 29, 2011

(54) APPARATUS AND METHOD FOR SPECTROSCOPY

(75) Inventors: Thomas D. Milster, Tucson, AZ (US); Pramod Kumar Khulbe, Oro Valley, AZ (US); Barry Gelernt, Oceanside, CA (US)

(73) Assignees: The Arizona Board of Regents on Behalf of The University of Arizona, Tucson, AZ (US); Invent Technologies LLC, Oceanside, CA (US)

( * ) Notice: Subject to any disclaimer, the term of this patent is extended or adjusted under 35 U.S.C. 154(b) by 0 days.

(21) Appl. No.: 12/614,281

(22) Filed: Nov. 6, 2009

(65) Prior Publication Data

US 2010/0053599 A1    Mar. 4, 2010

Related U.S. Application Data

(63) Continuation-in-part of application No. 12/304,494, filed as application No. PCT/US2007/071003 on Jun. 12, 2007.

(60) Provisional application No. 60/812,912, filed on Jun. 13, 2006, provisional application No. 61/198,687, filed on Nov. 7, 2008.

(51) Int. Cl.
*G01J 3/44* (2006.01)

(52) U.S. Cl. ....................................................... 356/301

(58) Field of Classification Search .................. 356/301, 356/51, 331
See application file for complete search history.

(56) References Cited

U.S. PATENT DOCUMENTS

| | | | |
|---|---|---|---|
| 3,507,987 | A | 4/1970 | Van Den Bosch |
| 4,617,531 | A | 10/1986 | Bowlds et al. |
| 4,863,253 | A | 9/1989 | Shafer et al. |
| 5,331,456 | A | 7/1994 | Horikawa |

(Continued)

FOREIGN PATENT DOCUMENTS

GB         1495104        12/1977

(Continued)

OTHER PUBLICATIONS

PCT Notification of Transmittal of the International Search Report and the Written Opinion of the International Searching Authority, or the Declaration, relating to International Application No. PCT/US07/71003, date of mailing, Feb. 20, 2008 (8 pgs.).

(Continued)

*Primary Examiner* — Tarifur Chowdhury
*Assistant Examiner* — Abdullahi Nur
(74) *Attorney, Agent, or Firm* — Whyte Hirschboeck Dudek S.C.

(57) ABSTRACT

Apparatuses and methods for performing spectroscopy and optical microscopy are disclosed. In at least one embodiment, a Raman spectrometer includes a vacuum ultraviolet light source configured to generate light having a wavelength within a window in the vacuum ultraviolet region of the electromagnetic spectrum within which a local minimum in the absorption coefficient of Oxygen occurs. The spectrometer also includes a lens device that receives a first portion of the generated light, directs at least some of the first portion of the generated light toward a target location, receives reflected light from the target location, and directs the reflected light toward a further location. The spectrometer further includes a dispersive device that receives at least some of the reflected light and outputs dispersed light produced based thereupon, and a camera module that is positioned at additional location, where the camera module receives at least some of the dispersed light.

30 Claims, 10 Drawing Sheets

U.S. PATENT DOCUMENTS

| | | | |
|---|---|---|---|
| 5,499,282 | A | 3/1996 | Silfvast |
| 6,343,089 | B1 | 1/2002 | Manos et al. |
| 6,369,398 | B1 | 4/2002 | Gelernt |
| 6,605,815 | B2 | 8/2003 | Gelernt |
| 6,650,357 | B1 * | 11/2003 | Richardson ............ 348/80 |
| 7,218,592 | B2 | 5/2007 | Park et al. |
| 7,218,596 | B2 | 5/2007 | Gelernt |
| 7,327,444 | B2 | 2/2008 | Naka et al. |
| 7,359,044 | B2 | 4/2008 | Nishiyama et al. |
| 2002/0136144 | A1 | 9/2002 | Hatano |
| 2005/0111081 | A1 | 5/2005 | Shafer et al. |
| 2006/0012780 | A1 | 1/2006 | Nishiyama et al. |
| 2006/0050146 | A1 | 3/2006 | Richardson |
| 2006/0072419 | A1 | 4/2006 | Tukker et al. |
| 2008/0304522 | A1 * | 12/2008 | Mills ........................ 372/5 |
| 2009/0168152 | A1 | 7/2009 | Gelernt |

FOREIGN PATENT DOCUMENTS

| | | |
|---|---|---|
| WO | 2007/146938 | 12/2007 |

OTHER PUBLICATIONS

Liberman et al., "Prospects for photolithography at 121 nm," J. Vac. Sci. Technol. B, vol. 20, No. 6, Nov./Dec. 2002 (pp. 2567-2573).

Joshi, "Generation of Radiation by Intense Plasma and Electromagnetic Undulators," Final Technical Report, Submitted by: The Regents of the University of California University of California, Los Angeles School of Engineering and Applied Science Los Angeles, Oct. 1991 (80 pgs.).

David et al., "Ultraviolet reflectance of AlN, diamond-like carbon, and SiC thin films," Appl. Phys. Lett., 57 (11), 1990 (pp. 1093-1095).

Norris et al., "Reflecting microscopes with spherical mirrors," J. Opt Soc. Am., 41, 111 (1951).

Miyata, "Reflecting microscope objectives with nonspherical mirrors," J. Opt. Soc. Am., 42, 431 (1952).

Grey, "A new series of microscope objectives: I. Catadioptric Newtonian Systems," J. Opt. Soc. Am., 39, 719 (1949).

Arioukov et al., "Schwartzschild Objective for Soft X-rays," (Opt. Eng. 39 (8), 2000 (pp. 2163-2170).

Grey, "A new series of microscope objectives: II. Preliminary investigation of catadioptric Schwarzschwarzschild systems," 39, 723 (1949).

Grey, "New series of microscope objectives: Ill. Ultraviolet objectives of intermediate numerical aperture," 40, 283 (1950).

Korsch, "Reflective Optics," Aademic Press, San Diego, (1991); 4 pages.

MacDonald, "Microwave Breakdown in Gases," John Wiley, New York, (1966); pp. 8, 19, 23, 25,26, 96-98.

Gelernt et al., "Quenching and Radiative Lifetimes for NH (b1ϵ+, v1=0)," Chem. Phys. Lett. 36, 238 (1975).

Zaidel & Schreider, "Vacuum Ultraviolet Spectroscopy," Ann Arbor-Humphrey Science Publishers 1970 (pp. 2-20, 47-53 and 280-281).

Hamamatsu Data Sheet for BT(Back-thinned)-CCD Digital Camera C8000-10, Hamamatsu Photonics, K.K. of Hamamatsu City, Japan, Jul. 2001 (2 pgs.).

Supplementary European Search Report, relating to Application No. EP 07 79 8444, date of completion of search, Jun. 16, 2009 (9 pgs.).

Atwood et al., "X-ray microimaging for the life sciences," EDB 90:159921, NDN-108-0533-3189-9, Conference date: May 24-26, 1989; 9 pages.

Watanabe, "Ultraviolet Absorption Processes in Upper Atmosphere," Advan. Geophys. 5, 153, 1958 (2 pgs.).

Yoshikawa et al., "Development of an extreme ultraviolet imaging spectrometer for the BepiColombo mission," Advances in Space Research, 33, (2004) (pp. 2195-2199).

UV Solutions, "High Brightness VUV Lamp" Spec. Sheet, © 2009 UV Solutions, Inc. (1 pg.).

De Wolf, "Raman Spectroscopy: About Chips and Stress," Spectroscopy Europe, 15/2, (2003) (pp. 6-13).

Jobin-Yvon Raman Applications, No. 01, available at http://www.jobinyvon.com/Raman/Semiconductor_Applications; available on or before 1989.

Chen et al., "Near-Field Solid Immersion Lens (SIL) Microscope with Advanced Compact Mechanical Design," Proc. SPIE, vol. 5380, Sep. 2004 (pp. 634-64).

Milster et al., "Maskless Lithography with Solid Immersion Lens Nano Probes," Proc. SPIE, vol. 5567, Dec. 2004 (pp. 545-556).

Chen et al., "Experimental investigation of solid immersion lens lithography," Proc. SPIE, vol. 5754, May 2005 (pp. 254-261).

Khulbe, et al., "Raman scattering from oval defects in GaAs epilayers, " Applied Physics Letters, vol. 63, Issue 4, Jul. 1993 (pp. 488-490).

Novotny, et al., "Principals of Nano-optics"; Nanoscale optical microscopy, 14 pages, 2006.

* cited by examiner

APPARATUS AND METHOD FOR SPECTROSCOPY

CROSS-REFERENCE TO RELATED APPLICATIONS

This application is a continuation-in-part of, and claims the benefit of, U.S. utility patent application Ser. No. 12/304,494 filed on Dec. 12, 2008 and entitled "Apparatus and Method for Deep Ultraviolet Microscopy", which is the U.S. national phase of PCT patent application no. PCT/US2007/071003 filed on Jun. 12, 2007 and entitled "Apparatus and Method for Deep Ultraviolet Microscopy", which in turn claims priority to U.S. provisional patent application No. 60/812,912 filed on Jun. 13, 2006 and entitled "Method and Apparatus for Deep Ultraviolet Microscopy", each of which is hereby incorporated by reference herein. This application further claims priority to U.S. provisional application No. 61/198,687 filed on Nov. 7, 2008 entitled "Raman Vacuum Ultraviolet Spectrometer", which also is hereby incorporated by reference herein.

STATEMENT REGARDING FEDERALLY SPONSORED RESEARCH OR DEVELOPMENT

Not Applicable

FIELD OF THE INVENTION

The present invention relates to optical techniques such as optical microscopy and/or Raman spectroscopy and, more particularly, to such optical techniques that employ light at wavelengths outside of the visible light spectrum.

BACKGROUND OF THE INVENTION

Optical microscopy and Raman spectroscopy are two examples of optical techniques that are useful in various applications but which suffer from certain limitations as conventionally implemented. With respect to optical microscopes, such devices have numerous applications in both the physical sciences as well as in the life sciences. In semiconductor manufacturing for example, visible light microscopes are used for inspecting semiconductor wafers following many of the several hundred process steps employed to fabricate semiconductor devices. This optical wafer inspection technique has advantages over the use of electron microscopy. In particular, optical microscopy is a non-destructive technique in that it does not involve breaking valuable wafers. Also, optical microscopy does not involve evaporating coating onto the samples, or evacuating the sample chamber, both of which can be time consuming. Further, optical microscopes typically do not cost as much as electron microscopes, and the technical skill level required to operate optical microscopes to obtain high quality micrographs typically need not be as high as that required to operate electron microscopes.

Notwithstanding the advantages of optical microscopes relative to electron microscopes such as those described above, in recent years there has been a significant decline in the sale of optical microscopes. This is partially due to a decline in their utility for semiconductor research and manufacturing, where the minimum feature size for present day devices has decreased to less than 0.5 microns, and in some advanced chip designs to less than 0.1 microns. In particular, because the ability of visible light optical microscopes to discern useful information concerning features of 0.5 microns or less is marginal, electron microscopes have increasingly become the tool of choice in observing such features.

In view of these considerations, and since the resolution of an optical imaging system scales linearly with wavelength, it is desirable to design an optical microscope that utilizes light at shorter wavelengths than light within the visible spectrum. A number of techniques involving shorter-wavelength light have been considered, yet these techniques suffer from various disadvantages. For example, while an optical microscope employing light within the near ultraviolet range (approximately 200 nm<$\lambda$<400 nm) may provide some wavelength advantage over a visible light optical microscope, the difficulties of image display and aberrations in optical components may not justify that advantage.

Also for example, a number of ultraviolet microscopes have been designed for the "soft X-ray" region, particularly at a wavelength of 2.48 nm. This wavelength is useful because of reduced water absorption by biological specimens in the range 2.4-4.4 nm. The radiation source is the six-fold ionized Nitrogen atom, N VII. However, it is difficult energetically to dissociate Nitrogen and then form the $N^{+6}$ ion in an electronically excited state. Indeed, to perform such a process and thereby generate light at the desired wavelength, complicated methods and equipment such as pinched plasma sources and high-powered pulsed lasers are necessary. Further, because the atmosphere substantially absorbs light at the above-mentioned wavelengths, optical microscopes utilizing light at such wavelengths typically must be designed so that the transmission of light occurs within a high vacuum. Implementation of a microscope in a manner such that light is transmitted within a high vacuum, however, can be challenging and costly.

As for Raman spectroscopy, which employs Raman scattering, such techniques have been used to measure the mechanical stress in thin films, various material substrates and, more particularly, semiconductors. The techniques yield information about phonon frequencies, energies of electronic states, impurity content, composition (e.g., SiGe films), doping levels, temperature and mechanical stress. Information regarding such characteristics can be of interest for a variety of reasons. For example, mechanical stress can adversely affect the functioning and reliability of microelectronic devices, micro-electromechanical systems (MEMS), and nanostructures. Stress in films can cause changes in electron or hole mobility, current leakage, dislocations near silicide lines, cracks in chips, fractures in MEMS, breaking of solder bumps, stress migration, etc.

Despite the many applications, the use of Raman spectroscopy has significant limitations, at least some of which are similar to those discussed above as pertaining optical microscopy. Such limitations are particularly problematic when using Raman spectroscopy to measure local stress in submicron features in semiconductor devices. Raman spectroscopy is performed by directing light toward a target and detecting Raman scattered light that is reflected by the target. Such Raman scattered light is inherently of low intensity by comparison with the intensity of the incident light directed toward the target, and yet the intensity of the received Raman scattered light signals is of great importance to the overall effectiveness of the spectroscopic measurements. In order to ensure that the Raman scattered light is of sufficient intensity, many conventional Raman spectrometers employ high-intensity laser light sources in the visible and near ultraviolet portions of the electromagnetic spectrum.

Although such high-intensity laser light sources generating light in the visible and near ultraviolet portions of the electromagnetic spectrum are effective for some applications, they are increasingly ineffective for performing Raman spectroscopy in relation to semiconductor devices and other devices/structures having small (e.g., sub-micron) features. To effectively probe increasingly small features in an accurate manner, it becomes desirable that the Raman spectrometer attain higher levels of resolution. Attainment of such higher levels of resolution is closely and directly tied, on several counts, to using light of shorter wavelengths/higher frequencies than the light provided by the aforementioned conventional light sources. First, the Raman shifted signal indicated by the Raman scattered light reflected off of a target is an "average" of the illuminated target volume, which corresponds to the size of the illuminated spot size or area, multiplied by the penetration depth of the light into the target. Since both the spot size and the penetration depth defining a target volume are strongly wavelength dependent (for example, in Silicon, the penetration into the film surface is 3000 nm at $\lambda=633$ nm, but only ~6 nm for radiation at 244 nm), higher resolution naturally flows from the use of light with shorter wavelengths. The intensities of the Raman peaks are also strongly wavelength dependent.

While such conventional light sources generating light in the visible and near ultraviolet portions of the electromagnetic spectrum are increasingly inadequate for providing desired higher levels of resolution, the desirability of a high-intensity light source for performing Raman spectroscopy only becomes higher as the target volumes of interest (and correspondingly the light wavelengths of interest) decrease. More particularly, as the features being probed on a target become smaller, the amount of Raman scattered light that is received from the target becomes smaller given the same light source (e.g., a pin point probing volume returns a very low signal by comparison with a larger target volume), and integration times become longer. Due to this factor as well as the above-mentioned factors, Raman scattering efficiency is proportional to $\lambda^{-4}$ (where $\lambda$ is the excitation wavelength). While in general the resolution of imaging optics improves linearly with decreasing wavelength, this does not overcome the aforementioned issues (spot size varies with $\lambda^2$).

Further complicating matters, light at wavelengths shorter than those of the near ultraviolet range (e.g., light at wavelengths of $\lambda<185$ nm or $\lambda<190$ nm) typically experiences much more intense absorption in air than light in the visible and near ultraviolet portions. Since it is impractical and/or costly to require that Raman spectrometry be performed within a vacuum or near vacuum, the aforementioned absorption of light at wavelengths shorter than those of the near ultraviolet range is yet an additional factor contributing to the desire for a high-intensity light source to produce this type of light. Yet laser light sources producing light at shorter wavelengths corresponding to the onset of the vacuum ultraviolet region and within the vacuum ultraviolet region, where the intensity of the light is sufficiently high to overcome the above complications, are generally lacking.

For at least these reasons, it would be advantageous if a new optical microscope and/or a new Raman spectrometer, and/or one or more associated imaging systems, and/or one or more related methods of performing optical microscopy and/or Raman spectrometry could be developed. In at least some embodiments, it would be particularly advantageous if such an improved microscope, Raman spectrometer, imaging system and/or method utilized light at one or more wavelengths that were shorter than those of the visible light spectrum, so as to allow for enhanced viewing or probing of small features. Further, in at least some embodiments, it would be particularly advantageous if such an improved microscope, Raman spectrometer, imaging system and/or method could be implemented without the need for extremely complicated or costly light sources, and/or could achieve successful operation even without the use of a high vacuum to facilitate the efficient transmission of light.

SUMMARY OF THE INVENTION

The present inventors have recognized that an improved optical microscope and/or an improved Raman spectrometer (and/or related imaging system(s) and/or method(s) of performing optical microscopy or Raman spectrometry) suitable for viewing and/or probing many small features can be achieved in at least some embodiments by utilizing the intense, substantially monochromatic and isolated radiation of the atomic Hydrogen resonance line at 121.6 nm (the Hydrogen Lyman-$\alpha$ line) in the deep or vacuum ultraviolet region of the electromagnetic spectrum (e.g., $\lambda<190$ nm or $\lambda<185$ nm). The present inventors have further recognized that the use of light at this wavelength is advantageous in several regards. More particularly, the present inventors have recognized that there is a narrow, highly transparent "window" in the air absorption spectrum, also precisely at 121.6 nm, such that light emitted at the Hydrogen Lyman-$\alpha$ line from a light source can be effectively transmitted within the optical microscope and/or Raman spectrometer without the need to work in high vacuum. Additionally, the present inventors have recognized that effective light sources and optical components can be developed for giving off, transmitting and/or processing strong, relatively-monochromatic light at the Hydrogen Lyman-$\alpha$ line.

More particularly, in at least some embodiments, the present invention relates to an apparatus including a deep ultraviolet light source configured to generate light having a wavelength within a window in the deep ultraviolet region of the electromagnetic spectrum within which a local minimum in the absorption coefficient of Oxygen occurs. The apparatus further includes a lens device that receives a first portion of the generated light, directs at least some of the first portion of the generated light toward a target location, receives reflected light from the target location, and directs the reflected light toward a further location. The apparatus also includes a camera device that is positioned at one of the further location and an additional location, where the camera device receives a first amount of the reflected light, whereby an image is generated by the camera device based upon the first amount of the reflected light. In some embodiments, the apparatus can be, for example, an optical microscope and in other embodiments the apparatus can be, further for example, a Raman spectrometer.

More particularly, in at least some embodiments the present invention relates to an apparatus for performing optical microscopy. The apparatus includes a deep ultraviolet light source configured to generate light having a wavelength within a window in the deep ultraviolet region of the electromagnetic spectrum within which a local minimum in the absorption coefficient of Oxygen occurs. Further, the apparatus includes a lens device that receives at least a first portion of the generated light, directs at least some of the first portion of the generated light toward a target location, receives reflected light from the target location, and directs at least some of the reflected light toward a further location. Additionally, the apparatus includes a camera device that is positioned at one of the further location and an additional location, where the camera device receives at least a second portion of the reflected light, whereby an image is generated by the camera device based upon the second portion of the reflected light.

Additionally, in at least some embodiments the present invention relates to a method of performing optical microscopy. The method includes generating light at a light source, wherein a wavelength of the generated light is within a window in the deep ultraviolet region of the electromagnetic spectrum within which a local minimum in the absorption coefficient of Oxygen occurs, the window being at least one of about 1.0 nm and about 2.0 nm in width. The method further includes transmitting the generated light to a target location by way of at least one lens device, and communicating reflected light received from the target location to a further location, where at least a portion of the reflected light is at the wavelength and occurs in response to the transmitting of the generated light to the target location. The method additionally includes producing an image based upon the reflected light.

Further, in at least some embodiments the present invention relates to an apparatus for performing optical microscopy. The apparatus includes means for generating light having a wavelength within a window in the deep ultraviolet region of the electromagnetic spectrum, where an absorption coefficient of Oxygen at standard temperature and pressure that corresponds to the first wavelength is less than 25 $atm^{-1}$ $cm^{-1}$. The apparatus additionally includes means for directing at least a first portion of the generated light toward a target region and for directing reflected light received from the target region toward a further location in a substantially collimated manner. The apparatus also includes means for producing an image based upon at least a portion of the reflected light, the image being representative of a feature of a target item positioned at the target region.

Additionally, in at least some embodiments, the present invention relates to a Raman spectrometer. The spectrometer includes a vacuum ultraviolet light source configured to generate light having a wavelength within a window in the vacuum ultraviolet region of the electromagnetic spectrum within which a local minimum in the absorption coefficient of Oxygen occurs. The spectrometer also includes a lens device that receives a first portion of the generated light, directs at least some of the first portion of the generated light toward a target location, receives reflected light from the target location, and directs the reflected light toward a further location. The spectrometer further includes a dispersive device that receives at least some of the reflected light and outputs dispersed light produced based thereupon, and a camera module that is positioned at additional location, where the camera module receives at least some of the dispersed light, whereby an image is generated by the camera device based upon the at least some of the dispersed light.

Further, in at least some embodiments the present invention relates to a method of performing spectroscopy. The method includes generating light at a light source, wherein a wavelength of the generated light is within a window in the deep ultraviolet region of the electromagnetic spectrum within which a local minimum in the absorption coefficient of Oxygen occurs, the window being at least one of about 1.0 nm and about 2.0 nm in width. The method also includes transmitting the generated light to a target location by way of at least one lens device, and communicating reflected light received from the target location to a further location, where at least a portion of the reflected light is at the wavelength and occurs in response to the transmitting of the generated light to the target location. The method further includes dispersing at least some of the reflected light into multiple light components, and producing an image based upon at least some of the multiple light components.

DETAILED DESCRIPTION OF THE PREFERRED EMBODIMENT

Figure 1:
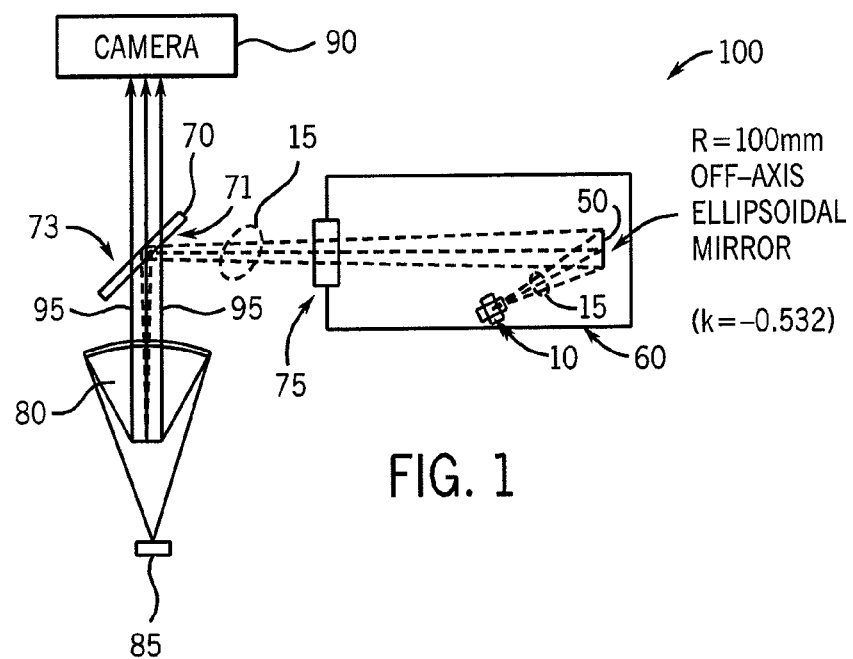
FIG. 1 shows, in simplified schematic form, exemplary components of an optical microscope that utilizes light at the Hydrogen Lyman-α line, in accordance with one embodiment of the present invention.

FIG. 1 illustrates, in simplified schematic form, exemplary components of an optical microscope 100, in accordance with at least one embodiment of the present invention. As will be described in further detail below, the optical microscope 100 operates through the use of light at the Hydrogen Lyman-α line, that is, light at (or approximately at) a wavelength of 121.6 nm. This wavelength is in the "vacuum ultraviolet" and "deep ultraviolet" regions of the electromagnetic spectrum, which generally overlap one another, albeit the vacuum ultraviolet region is generally understood to extend from the region of strong absorption by molecular Oxygen near about 190 nm (or alternatively near about 185 nm) to the "Soft" X-ray region near 20 nm while the deep ultraviolet region is generally understood to extend to wavelengths somewhat higher than 190 nm (e.g., up to nearly 200 (e.g., 193) or 250 (e.g., 248) nm. Further as will be described below, utilization of light at the Hydrogen Lyman-α line should provide about a four-fold increase in the resolution achievable by the optical microscope 100 relative to conventional optical microscopes, and thereby extend the usefulness of optical microscopy to a variety of applications.

As shown in FIG. 1, the optical microscope 100 in the present embodiment includes a source module 60, a beam splitter 70, an objective lens 80, and a camera module 90. Within the source module 60, light at the Hydrogen Lyman-α line is generated by way of a microwave-driven gas-discharge light source 10, which is described in further detail with respect to FIG. 9. Further as shown, light 15 emanating from the light source 10 is reimaged by an ellipsoidal mirror 50, which also is positioned within the source module 60. The ellipsoidal mirror 50 in turn reflects the light 15 out of the source module 60 and toward the beam splitter 70. In some embodiments including the present embodiment, to pass out of the source module 60 the light 15 passes through an optical window 75. By employing such a window, the interior of the source module 60 can be substantially sealed off from the outside atmosphere.

Upon the light 15 reaching the beam splitter 70, the beam splitter reflects a fraction of the incoming light 15 to the objective lens 80. Although the beam splitter 70 can take various forms, in the present embodiment it is a $MgF_2$ beam splitter that includes a first substantially planar surface 71 oriented at approximately 45 degrees relative to the path of the light 15 emanating towards it, such that the reflected light proceeding away from the beam splitter proceeds in a direction that is approximately 90 degrees relative to the incoming light. In at least some embodiments, the surface 71 can have deposited on it a thin-film coating that allows a fraction of the light 15 to be reflected to the objective lens 80 and a second fraction to be transmitted.

Figure 2:
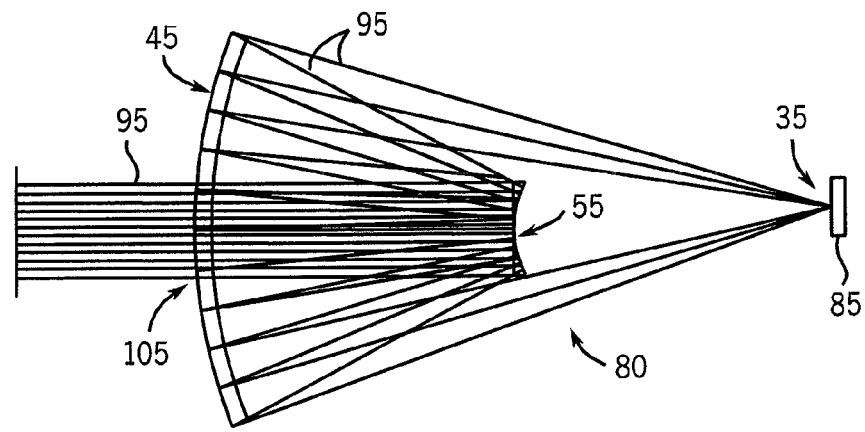
FIG. 2 shows in further detail an objective lens employed in the optical microscope of FIG. 1, in accordance with one embodiment of the present invention.
Figure 3D:
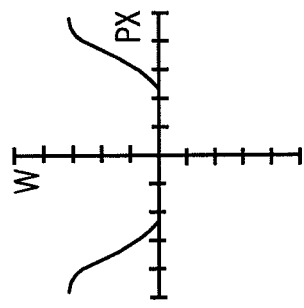
FIGS. 3A-3D show exemplary wavefans for the objective lens of FIGS. 1-2.
Figure 3C:
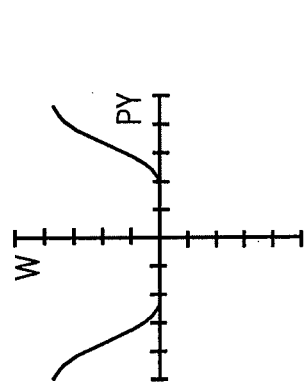
Figure 3B:
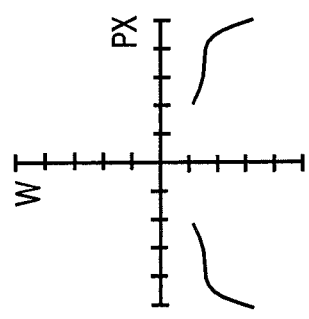
Figure 3A:
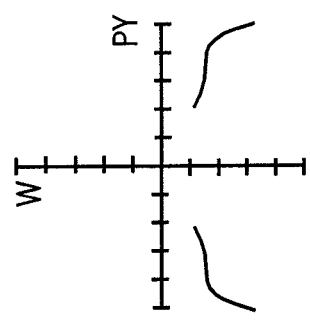
Figure 4A:
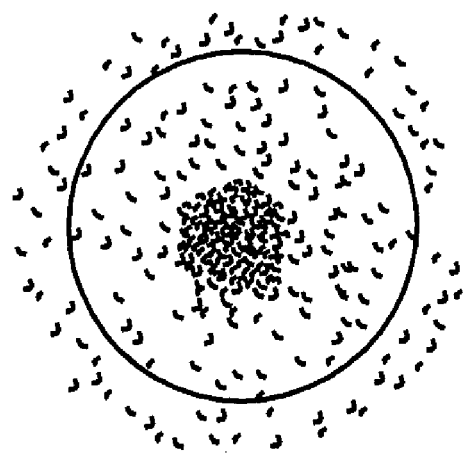
FIGS. 4A-4B shows exemplary spot diagrams for the objective lens of FIGS. 1-2.
Figure 4B:
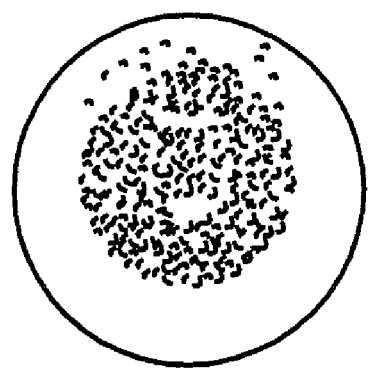

As described in further detail with respect to FIG. 2, the objective lens 80 upon receiving the reflected light from the beam splitter 70 then directs that light at a target 85, which can be any of a variety of structures, materials, etc. (e.g., semiconductor wafers or biological cells). Depending upon the target 85, typically some or most (or even all) of the light incident upon the target is reflected off of the target back toward the objective lens 80. This light reflected off of the target 85 and received by the objective lens 80 then is directed back to the beam splitter 70 by the objective lens as returning light 95. Due to the design of the beam splitter 70 and any additional thin-film coating provided on the surface 71, a fraction of the returning light 95 proceeds through the beam splitter (instead of being reflected by the beam splitter) toward the camera module 90.

The returning light 95 proceeding to the camera module 90 is collimated or substantially collimated such that it is capable of being used for imaging purposes. Thus, upon receiving the returning light 95, the camera module in turn is capable of receiving and observing/storing the light and generating images or imaging information indicative of one or more features of the target 85 based upon that light. Alternatively, the returning light 95 can be slowly converging in order to form an image inside the camera module 90. Additionally, in at least some embodiments, a second substantially-planar surface 73 of the beam splitter 70 (on the opposite side of the beam splitter relative to the first substantially-planar surface 71) can also have an anti-reflection film deposited thereon, so as to limit ghost images from reaching the camera module 90.

In use, the optical microscope 100 operates as follows. First, before the providing of any light from the light source 10 at the Hydrogen Lyman-α line, an operator will first locate the feature of interest (e.g., the target 85 or a portion thereof) using a visible light source (e.g., 400 nm <λ<700 nm), which is not shown in FIG. 1. Upon locating the feature of interest, the operator then switches on the light source 10 (and switches off the visible light source). At that point, the light 15 is directed from the light source 10 to the target 85 by way of the beam splitter 70, mirror 50, etc., which in turn results in the providing of the returning light 95 from the target to the camera module 90. The operator then is able to view a high resolution image obtained by way of the camera module 90 on a video display monitor, which can be considered to form part of the camera module or alternatively be separate from it (e.g., in the form of a personal computer coupled to the camera module by way of a dedicated communication link, a network link, the Internet, wireless communications, or otherwise). Also, the images can be printed in hardcopy form by way of the camera module or otherwise.

Referring additionally to FIG. 2, the objective lens 80 of FIG. 1 is shown in somewhat more detail in relation to the target 85. FIG. 2 particularly illustrates exemplary paths of the returning light 95 reflected off of the target 85, which can be understood as being positioned at a focal point 35. As shown, the central portion of the beam of the returning light 95 provided from the target 85 is occluded from the first spherical mirror 45 by the second spherical mirror 55. The portion of the returning light 95 that reaches the first spherical mirror 45 is reflected by that mirror back to the second mirror 55, which in turn reflects the light out of the objective lens 80 by way of an orifice 105 formed within the first spherical mirror (toward the beam splitter 70 and ultimately the camera module 90). The light emanating from out of the objective lens 80 by way of the orifice 105 preferably is collimated, or substantially collimated. Although not shown in detail, the light 15 from the light source 10 entering the objective lens 80 takes paths that are the opposite or substantially the opposite of those shown. More particularly, upon entering the objective lens 80 by way of the orifice 105, the light 15 is reflected off of the second spherical mirror 55 (which constitutes the pupil of the lens) back toward the first spherical mirror 45, which in turn reflects the light toward the target 85. Although it is not necessarily the case, preferably the objective lens 80, upon receiving the light 15 from the light source, produces uniform Kohler illumination for the target 85 (albeit, more important than producing uniform Kohler illumination is that an accurate camera module 90 be employed in the system).

The objective lens 80 in the present embodiment is a simple Schwartzschild configuration lens having first and second spherical mirrors 45 and 55, respectively, such as that described in "Schwartzschild Objective for Soft X-rays" by I. A. Arioukov and K. M. Krymski (Opt. Eng. 39 (8), 2163-2170 (2000)), which is hereby incorporated by reference herein. In the present embodiment, the objective lens 80 is optimized for an infinite image conjugate in Zemax® lens design software available from ZEMAX Development Corporation of Bellevue, Wash. In particular, the first spherical mirror 45 has a clear aperture diameter of 42.26 mm. For an operation wavelength of 121.6 nm, a numerical aperture of slightly greater than 0.3 is achieved with reasonable field performance out to a field diameter of about 300 μm. Additional details regarding the design are provided in Table 1.

TABLE 1

OBJECTIVE LENS PRESCRIPTION

| Surface/<br>Reference Numeral | Radius<br>(mm) | Thickness to<br>next element<br>(mm) | Description |
|---|---|---|---|
| Beam Splitter/70 or<br>Camera Module/90 | Infinity | Infinity | Object is at infinity<br>(reversed configuration<br>for design) |
| Second Spherical<br>Mirror/55 | 20.00 | −32.33 | Second spherical mirror<br>that also functions as the<br>stop. |
| First Spherical<br>Mirror/45 | 52.36 | 68.62 | First spherical mirror |
| Target/85 | Infinity | 0 | Image |

Further exemplary characteristics of the objective lens 80 of FIGS. 1-2 are shown in FIGS. 3A-3D and 4A-4B. More particularly, FIGS. 3A-3D show exemplary wavefans for the objective lens 80, where the lines shown represent the departure of the ideal focusing beam from the real beam as measured at the pupil (the second spherical mirror 55) of the objective lens (with an assumed wavelength $\lambda$=121.6 nm). The maximum vertical sale for the wavefans is +/−0.2 wavelengths. The horizontal axes correspond to the dimension across the center of the pupil, from edge to edge (e.g., either the x-axis or the y-axis). The wavefans of FIGS. 3A and 3B, which are respectively plotted versus x-direction and y-direction orthogonal measurement lines across the center of the pupil, correspond to the lens performance of a point centered (0.0000 degrees) in the field of the target 85. The wavefans of FIGS. 3C and 3D, which are respectively plotted versus x-direction and y-direction orthogonal measurement lines across the center of the pupil, correspond to the lens performance of a point at the edge (0.5000 degrees or 0.141 mm) of the field of the target 85. As for FIGS. 4A-4B, these show exemplary spot diagrams for the objective lens 80. In particular, the airy disk diameter (ideal diffraction-limited diameter) is indicated by the circles. The points represent the intersection of the geometric rays, as traced through the system from the target. The spot diagram of FIG. 4A in particular corresponds to the lens performance of a point centered (0.0000 degrees) in the field of the target 85. The spot diagram of FIG. 4B by comparison corresponds to the lens performance of a point at the edge (0.5000 degrees or 0.141 mm) of the field of the target 85.

Additionally it should be noted that, in at least some embodiments, a thin-film coating can be provided on the mirrors 45, 55, in order to enhance mirror reflectivity. One such film is a CVD-coated SiC material, which has between 40% to 50% reflectivity at $\lambda$=121.6 nm (e.g., reflectivity above 45% in the vacuum ultraviolet region of interest) and exhibits a refractive index of 2.66 leading to a 20% reflectivity for visible light, as described in an article entitled "Ultraviolet reflectance of AlN, diamond-like carbon, and SiC thin films," by M. David, et. al., Appl. Phys. Lett., 57 (11), pp. 1093-1095 (1990), which also is hereby incorporated by reference herein.

Notwithstanding the above description of the objective lens 80, a variety of other lens designs can also be employed depending upon the embodiment, and the present invention is intended to encompass the use of any of a variety of different lenses (including sets of multiple lenses). In embodiments similar to that discussed above in which both visible light and light at the Hydrogen Lyman-$\alpha$ line are used, the large variation in wavelength between the visible light and the light at the Hydrogen Lyman-$\alpha$ line makes it undesirable to utilize refractive optics due to chromatic aberration. Given that to be the case, reflective objective lens designs such as that described above are preferred for such embodiments. Other such reflective lens designs can also be employed including, for example, lens designs employing spherical mirrors in which the Schwartzschild conditions are relaxed (and in which no refracting components or compensating lenses are employed), as described in an article entitled "Reflecting microscopes with spherical mirrors" by K. P. Norris et. al. found in J. Opt. Soc. Am., 41, 111 (1951), which is hereby incorporated by reference herein (the numerical aperture for the microscope shown in that article employing such lenses was approximately 0.65).

In further embodiments, non-spherical mirrors can be utilized in the optical microscope, for example, as shown in an article entitled "Reflecting microscope objectives with non-spherical mirrors" by S. Miyata found in J. Opt. Soc. Am, 42, 431 (1952), which is hereby incorporated by reference herein (in this example, the aplanatic objective lens was free of spherical aberration and coma). Also, notwithstanding the above description regarding the objective lens 80, in some alternate embodiments additional improvements to Schwartzschild mirrors can be employed, as described in articles by D. S. Grey found in the Journal of the Optical Society of America (J. Opt. Soc. Am.) entitled "A new series of microscope objectives: 1. Catadioptric Newtonian Systems", 39, 719 (1949) (co-author Paul Lee), "A new series of microscope objectives: II. Preliminary investigation of catadioptric Schwarzschild systems" 39, 723 (1949), and "New series of microscope objectives: III. Ultraviolet objectives of intermediate numerical aperture" 40, 283 (1950), which also are hereby incorporated by reference herein. Still in further embodiments, other types of mirrors or mirror assemblies such as Cassegrain reflectors can instead (or in addition) be utilized.

Figure 5A:
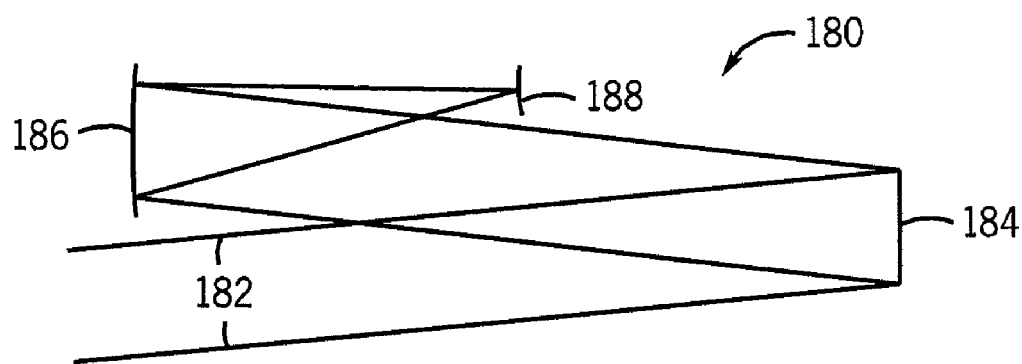
FIGS. 5A-5B show, in further detail, first and second additional objective lenses that can be employed in the optical microscope of FIG. 1.
Figure 5B:
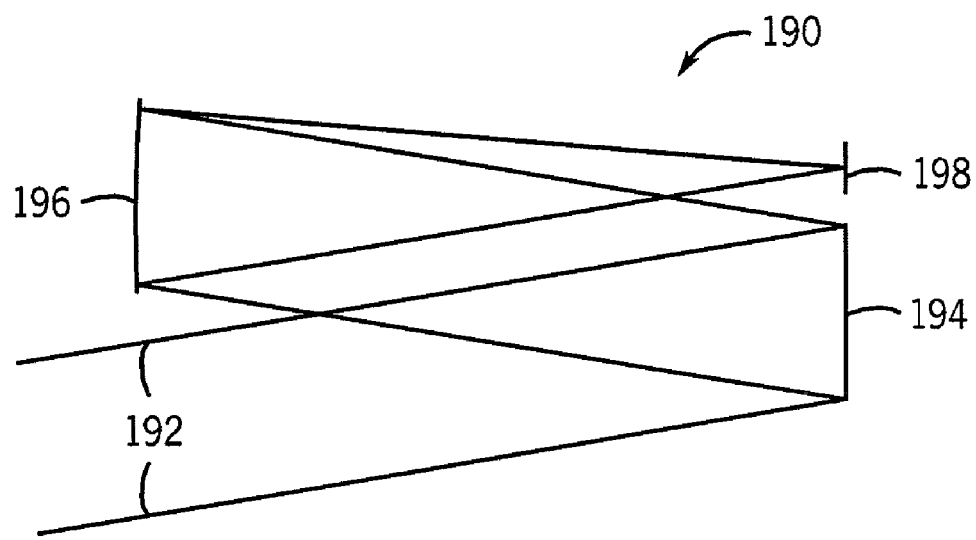

Further in this regard, FIGS. 5A and 5B illustrate first and second additional embodiments for objective lenses 180 and 190, respectively, which are described in additional detail at pages 200 and 202, respectively, of "Reflective Optics" by Dietrich Korsch (Academic Press, San Diego, 1991), which is hereby incorporated by reference herein. As shown, the objective lens 180 is a reflective analog of a Schmidt telescope in which incoming light rays 182 (e.g., light from the light source 10) are first reflected off of a primary correction (entrance pupil) mirror 184 and then subsequently reflected a second time off of a spherical secondary mirror 186, which focuses the rays at a focal point 188 (albeit in this example it should be understood that the path(s) of the light rays are not the same as the paths from a light source in a Kohler configuration). Light reflected off of a target (such as the target 85 of FIG. 1) located at the focal point 188 can return along a path that is effectively the reverse of that followed by the incoming rays 182, after which the light is directed toward a camera module (e.g., by way of the beam splitter 70). As for the objective lens 190, it is an aplanatic, flat-field two-mirror telescope with a primary corrector. More particularly as shown, incoming light rays 192 are first received at and reflected by a primary corrector mirror 194, which reflects the light toward a secondary mirror 196, which in this example is of an oblate ellipsoid shape. The secondary mirror 196 in turn reflects and focuses the light toward a focal point 198, at which can be a target (and where, again, the light ray paths are not identical to those of a Kohler configuration). Light reflected off of the target can return along a path that is effectively the reverse of that followed by the incoming rays 182, after which the light is directed toward a camera module.

Although the above embodiments employing visible light in addition to light at the Hydrogen Lyman-α line envision the use of only reflective objective lens designs, it should be further noted that in other alternate embodiments it is possible to utilize both reflective and refractive optics. For example, several of the above-referenced reflective microscope designs described in the literature were intended for use with an illumination source being the Hg 253.7 nm emission line, in the near ultraviolet spectral region where air is transparent. Quartz is also transparent in this region and consequently a microscope design comprising both reflective and refractive optics is possible. Further, in still other alternate embodiments, it is not necessary to utilize a visible light source at all. For example, the use of visible emissions from a Hydrogen/Helium discharge will obviate the need for a separate visible light source. This visible emission from the gas-discharge is mainly due to Hydrogen Balmer lines and electron-ion recombination emission in the gas-discharge region.

Figure 6:
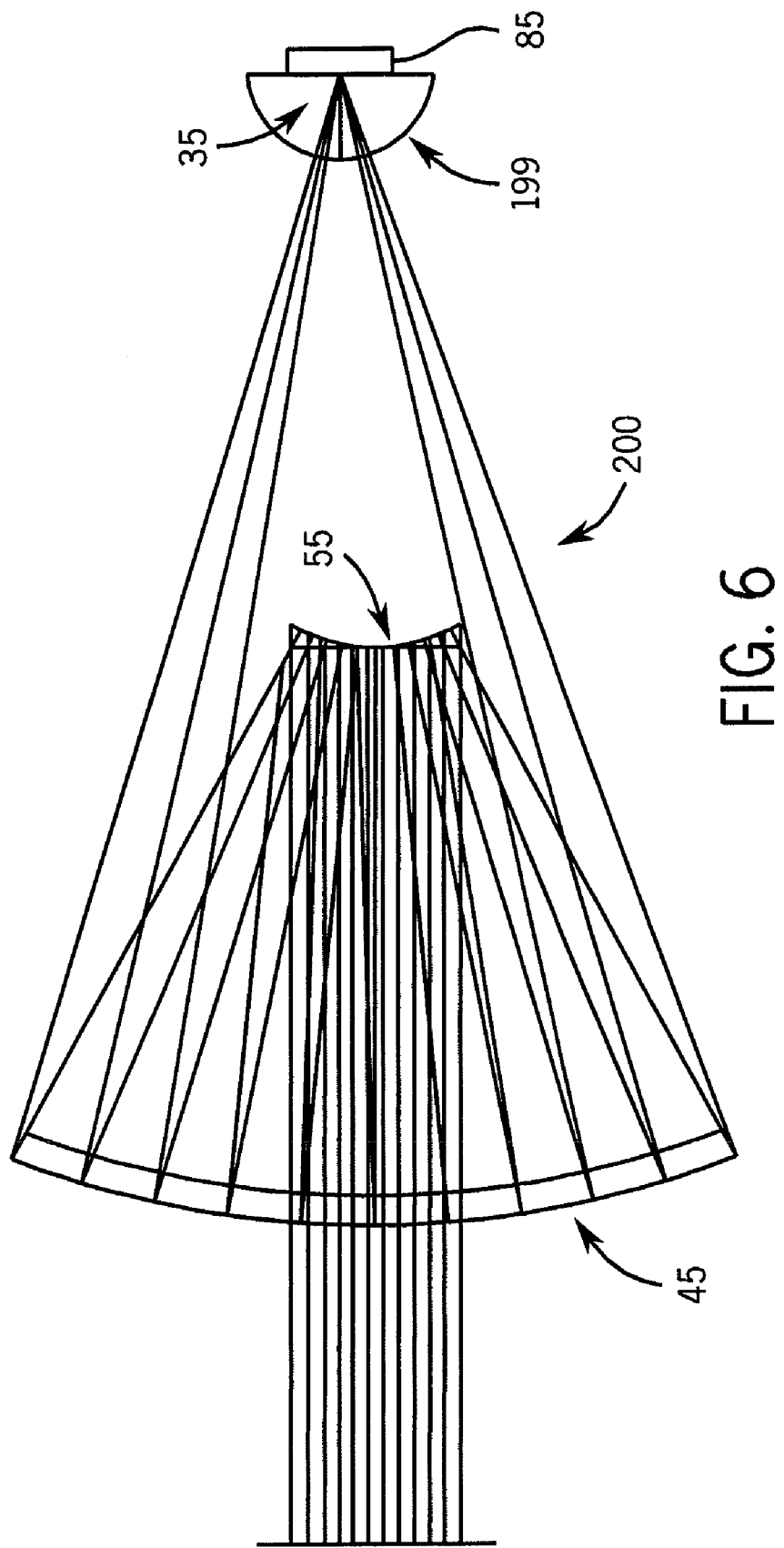
FIG. 6 shows a further exemplary lens arrangement including a solid immersion lens, which can be employed in the optical microscope of FIG. 1.

Additional lens systems having both reflective and refractive optical components can be formed through the use of a solid immersion lens (SIL) (or possibly several such lenses). For example, one such system 200, which is shown in FIG. 6, incorporates both a SIL 199 in combination with an objective lens such as the objective lens 80 of FIG. 2 having both the first and second spherical mirrors 45 and 55, respectively. As shown, the SIL 199 in this embodiment is positioned proximate the focal point 35 at which is located the target 85. SILs such as the SIL 199 can be made from LiF or $MgF_2$. A SIL composed of an image-centric LiF hemisphere in particular can increase the effective numerical aperture of the system from 0.3 to 0.486. Other reflective microscope designs with higher numerical aperture can also, when augmented with a SIL, produce numerical apertures greater than 1.0.

As already noted, the optical microscope 100 shown in FIG. 1 employs light at the Hydrogen Lyman-α line, that is, light having a wavelength of 121.6 nm (or substantially or approximately 121.6 nm). The use of light at this wavelength is advantageous in several regards. First, light at the Hydrogen Lyman-α line is fairly easily transmissible through air without a vacuum, such that the optical microscope 100 can be operated without any need for a high-vacuum light path. More particularly, strong absorption of light by molecular Oxygen ($O_2$) generally occurs for wavelengths below about 190 nm, such that air generally is opaque in the deep ultraviolet region of the electromagnetic spectrum. However, by a coincidence of Nature, there exists a narrow, highly transparent "window" in the air absorption spectrum that coincides with the Hydrogen Lyman-α line. Variation in the absorption of light by Oxygen at and around the Hydrogen Lyman-α line is shown in FIGS. 7 and 8, which respectively show the absorption spectrum in Oxygen between 125 nm and about 180 nm, and the absorption spectrum in Oxygen between 105 nm and about 135 nm, respectively.

Figure 7:
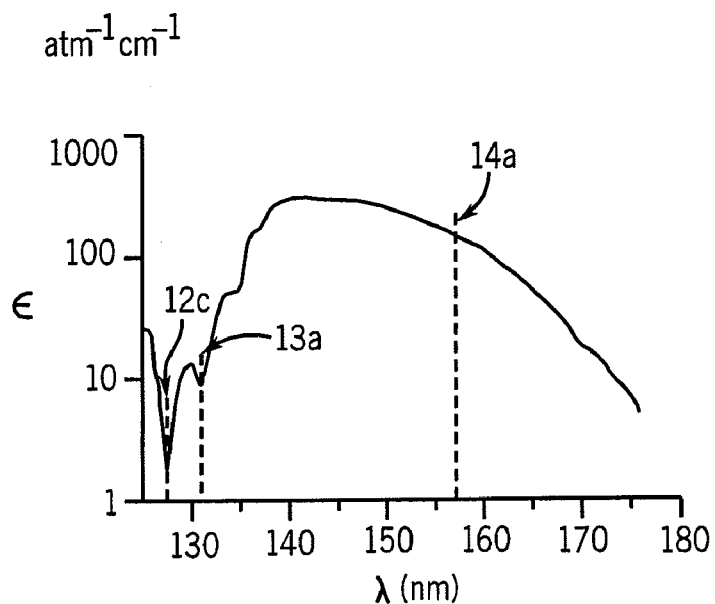
FIG. 7 is the absorption spectrum of Oxygen between 125 nm and about 180 nm.
Figure 8:
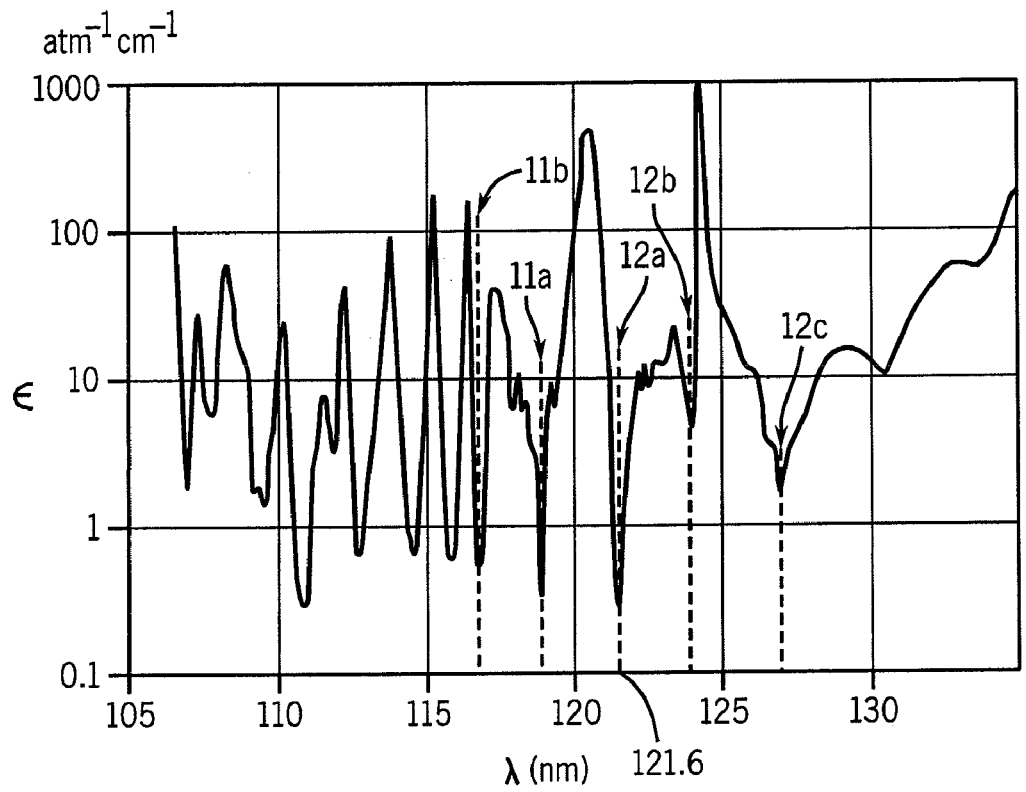
FIG. 8 is the absorption spectrum in Oxygen between 105 nm and about 135 nm, showing an absorption "window" at 121.6 nm.

More particularly as shown in FIGS. 7 and 8, the absorption coefficient of Oxygen with respect to light having wavelength(s) at or near 121.6 nm is particularly low in comparison with the absorption coefficients for light at essentially all wavelengths longer than 121.6 nm, up to at least about 180 nm. Further as shown particularly in FIG. 8, at standard temperature and pressure, the absorption coefficient of Oxygen ε (in $atm^{-1}\ cm^{-1}$) has a local minimum at the Hydrogen Lyman-α line (λ=121.6 nm), and the absorption coefficient remains less than 25 $atm^{-1}\ cm^{-1}$ within a window encompassing the Hydrogen Lyman-α line that is approximately 1 to 2 nm (or even slightly larger) in width. The absorption coefficient of Oxygen ε for light at 121.6 nm specifically is about 0.3 $atm^{-1}\ cm^{-1}$, as indicated by a location 12a of FIG. 8, which is one to three orders of magnitude less than the absorption coefficients for light at other wavelengths between this window and 175 nm.

Because of this window in the Oxygen (and consequently, atmospheric air) spectrum for light at the Hydrogen Lyman-α line, for path lengths of a few centimeters in air, at atmospheric pressure, transmission of light at the Hydrogen Lyman-α line exceeds 50%. For example, if light at 121.6 nm having an absorption coefficient of 0.3 $atm^{-1}\ cm^{-1}$ is transmitted over a 2 cm distance, the light will only experience about 12% absorption, such that 88% of the light will be transmitted over such transmission path. This is in contrast to the absorption associated with light having a wavelength of, for example, 157 nm (see arrow 14a of FIG. 7), in which nearly total absorption occurs over a transmission path of less than 1 mm as a result of the high absorption coefficient (about 200 $atm^{-1}\ cm^{-1}$). Table 2 shows in more detail the path length in air required at various pressures for a fifty percent absorption of radiation, for two different absorption coefficients: $\epsilon_{121.6}$=0.3 $atm^{-1}\ cm^{-1}$, and $\epsilon_{150.0}$=200 $atm^{-1}\ cm^{-1}$. From this information, it is apparent that the use of light at the Hydrogen Lyman-α line allows for much more efficient transmission of the light through the air than is afforded when using light having a wavelength of 150 nm.

TABLE 2

MAXIMUM PATH LENGTHS WITHIN AIR ALLOWING FOR 50% TRANSMISSION OF LIGHT AT 121.6 NM AND 150 NM

| P (atm.) | Light Path (cm) @ 121.6 nm | Light path (cm) @ 150.0 nm |
|---|---|---|
| 1.00 | 11.0 | 0.0165 |
| 0.50 | 22.0 | 0.033 |
| 0.10 | 110 | 0.165 |
| 0.050 | 220 | 0.330 |
| 0.010 | 1100 | 1.65 |
| 0.0010 | 11000 | 16.5 |

Although the use of light at the Hydrogen Lyman-α line having a wavelength of 121.6 nm is particularly advantageous for transmission purposes, FIGS. 7 and 8 additionally illustrate that there are several other local minima in terms of absorption that occur proximate the Hydrogen Lyman-α line, within a region extending below about 135 nm. For example, additional local minima also occur at locations 11a, 11b, 12b, 12c, and 13a, all of which are within about 10 nm of the Hydrogen Lyman-α line. Therefore, although the above-described embodiments of the invention primarily envision the use of light at the Hydrogen Lyman-α line, it is possible that alternate embodiments of the invention would utilize light at other wavelengths instead of or in addition to light at the Hydrogen Lyman-α line, and particularly light at wavelengths corresponding to the aforementioned locations at which absorption minima occur.

In addition to coinciding with a window in the Oxygen absorption spectrum, the use of light at the Hydrogen Lyman-α line is also advantageous in that it can be fairly easily generated by way of any of a variety of different light source mechanisms. It is well known that microwave excitation is effective in creating gaseous discharge emissions, for example, as shown in "Microwave Breakdown in Gases" by A. D. MacDonald (John Wiley, New York, 1966), which is hereby incorporated by reference herein. Further for example, small, microwave driven Hydrogen Lyman-α line light sources (and the Deuterium analog) have been fabricated to study chemical kinetics, as described by an article entitled "Quenching and Radiative Lifetimes for NH ($b^1\epsilon^+$, v¹=0)" by B. Gelernt and S. V. Filseth in Chem. Phys. Lett. 36, 238 (1975), which is hereby incorporated by reference herein.

Figure 9:
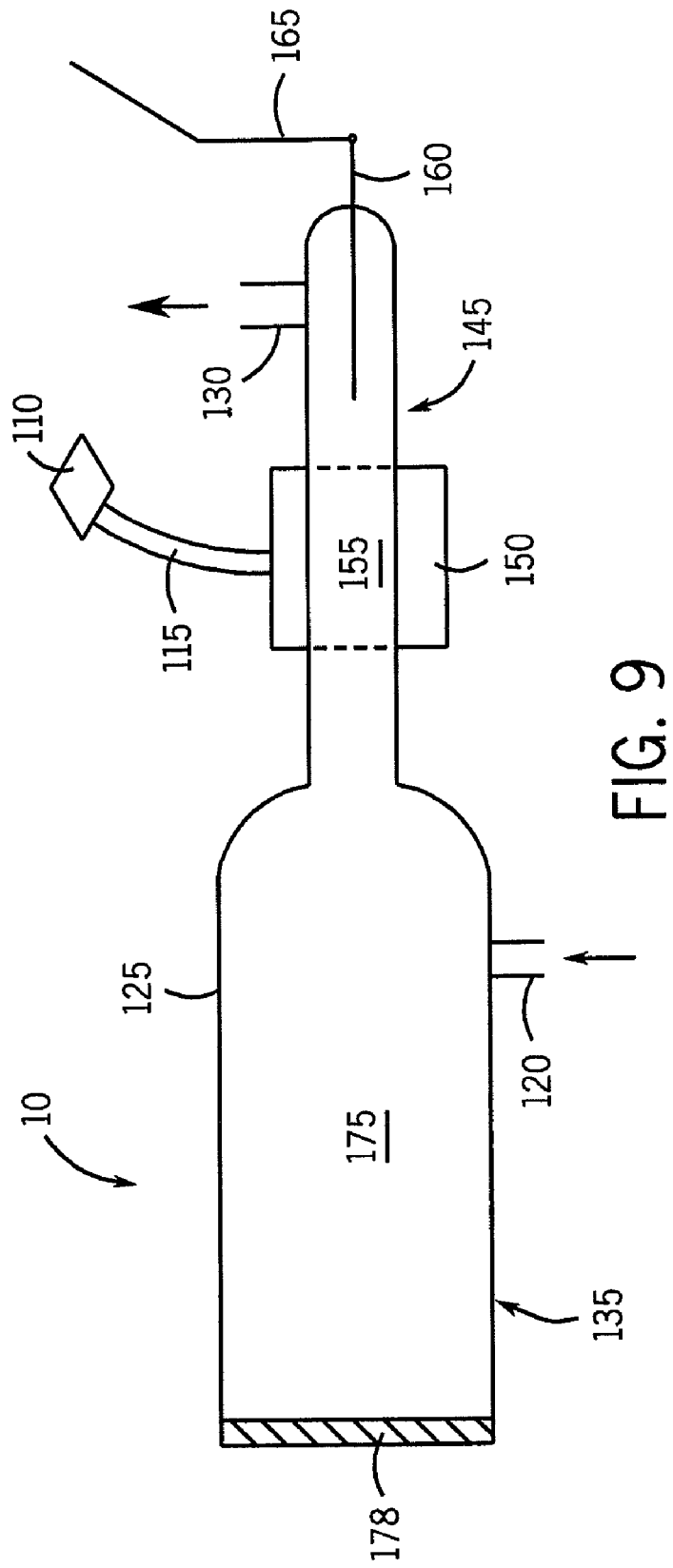
FIG. 9 shows in schematic form one exemplary design of a light source capable of producing light at the Hydrogen Lyman-α line that can be employed in the optical microscope of FIG. 1, in accordance with one embodiment of the present invention.

Turning to FIG. 9, one exemplary configuration of the light source 10 of FIG. 1 that is capable of producing light at the Hydrogen Lyman-α line in accordance with one embodiment of the present invention is shown to involve a microwave-excited gas discharge process. In this exemplary embodiment, the microwave energy is provided by a microwave source 110 (or, in alternate embodiments, by some other excitation source). The Hydrogen Lyman-α line is at a much shorter wavelength than other Hydrogen emissions or Helium discharge emissions (above the LiF cut-off), and background emission is avoided if Helium is used as a diluent gas in the light source, as discussed in "Vacuum Ultraviolet Spectroscopy" by Zaidel & Shreider, pp. 2-20, Ann Arbor-Humphrey Science Publishers, (1970), which is hereby incorporated by reference herein. Thus, in the present embodiment, a $H_2$/He mixture is introduced via a gas inlet 120 into a housing 125 of the light source 10 and subsequently exits the housing via a gas outlet 130. It can be desirable to have a mixture in which the $H_2$ component is below the flammability limit; however, mixtures with higher concentrations of Hydrogen can also be utilized.

Further as shown, the housing 125 in the present embodiment is a substantially elongated structure of tubular cross-section, where about a first half 135 of the housing is of a larger diameter and a second half 145 of the housing is of a smaller diameter. Additionally, the housing 125 in the present embodiment can be fabricated from quartz or other suitable, non-electrically-conductive material, and in other embodiments can be made from other materials as well. To produce flow of the $H_2$/He mixture through the housing 125 and out the outlet 130, a low capacity mechanical pump (not shown) is further attached to the outlet. The $H_2$/He mixture within the housing 125 is typically desirably maintained at a sub-atmospheric pressure within an interior 175 of the housing. To regulate the pressure within the interior 175, a needle valve (not shown) is also attached to the gas inlet 120 and, by way of a controller (or other mechanism), the operation of the mechanical pump is controlled based upon the information from the needle valve so as to control and regulate the sub-atmospheric pressure in the housing 125.

Additionally as shown, a cylindrical (annular) microwave cavity 150 (such as a quarter-wave Evenson Cavity) concentrically surrounds a discharge region 155 of the second half 145 of the housing 125. Power from the microwave source 110 is supplied to the microwave cavity 150 by way of a waveguide conduit 115. To facilitate initial gas breakdown (as may not always automatically occur) and thereby field ionize the gas mixture components within the interior 175 of the housing 125, a high-voltage pulse through an electrode 160 is also provided at the outer end of the second half 145 of the housing 125 as shown. The electrode 160 is connected to a high-voltage source (not shown) through an electrical lead (or leads) 165. Optimization of the light source 10 depends on various factors, which can be varied depending upon the embodiment, including mixture composition, microwave frequency and power, dimensions of the discharge region 155, gas pressure, and cavity tuning.

Figure 10:
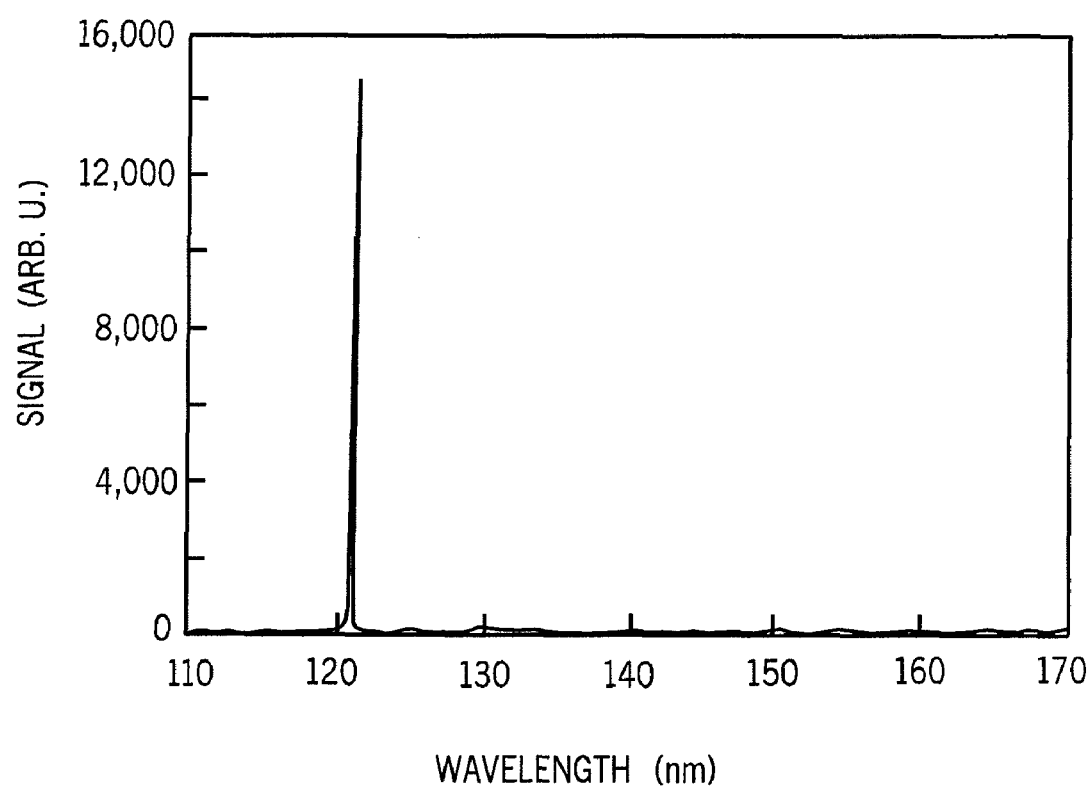
FIG. 10 is the emission spectrum of a Hydrogen-discharge light source such as that of FIG. 9, between about 110 nm and 170 nm.

Once the gas mixture within the interior 175 is appropriately ionized, and microwave energy is communicated to the discharge region 155 by way of the microwave source 110, the waveguide conduit 115 and the microwave cavity 150, a gas discharge occurs in which the Hydrogen portion of the gas mixture emits light at the Hydrogen Lyman-α line. The Hydrogen Lyman-α line at 121.6 nm is a high-intensity, non-coherent source, and more particularly, is actually a spectroscopic doublet, where the two equal intensity, nearly degenerate components have a separation of only 0.0005 nm so as to result in essentially a monochromatic light source. FIG. 10 shows the emission spectrum of a Hydrogen discharge between 110 nm and 170 nm to include the Hydrogen Lyman-α line at 121.6 nm, as can be found in an article entitled "Prospects for photolithography at 121 nm" by Lieberman et al. in J. Vac. Sci. Technol. B, 20 No. 6 November/December 2002, which is hereby incorporated by reference herein. It should be noted that, in the present embodiment, the light source 10 is capable of being varied in its power output (e.g., it can provide a higher-level power output, and therefore a more intense Hydrogen Lyman-α emission). Depending upon the embodiment, the light output from the light source 10 can be pulsed, but need not be pulsed (for example, the light output can instead be continuous). Notwithstanding the above description, a variety of other Hydrogen Lyman-α sources can be fabricated and utilized for different embodiments of the present invention (for example, a light source driven by a Gunn diode microwave chip or other excitation source). While microwave excitation can be effective in creating gaseous discharge emissions, the present invention is intended to encompass a variety of types of excitation and not necessarily be limited to microwave excitation.

While the above description suggests that the light emanating from the light source 10 is exactly at the Hydrogen Lyman-α line, this is not to say that the light source 10 necessarily will be limited to emitting light at the wavelength of the Hydrogen Lyman-α line, 121.6 nm. Rather, the present invention is intended to encompass various embodiments in which all or a substantial proportion of light generated by the light source is within (or concentrated at) a window in the deep ultraviolet region of the electromagnetic spectrum at which the absorption coefficient of Oxygen is sufficiently low so as to make transmission of the light feasible in the absence of a high vacuum. Thus, while some embodiments of the invention employ light that is only exactly (or substantially exactly) at the wavelength of the Hydrogen Lyman-α line, 121.6 nm, other embodiments of the invention generate light within a window or small range of wavelengths about the wavelength of the Hydrogen Lyman-α line.

For example, in some embodiments, the light source generates light within a window that is at least one of about 1.0 nm and about 2.0 nm in width and encompasses the wavelength of the Hydrogen Lyman-α line, for example, light at wavelengths ranging approximately from 121.0 to 122.0 nm or from 121.1 to 122.1 nm, or from 120.5 to 122.5 or from 120.6 to 122.6. In still further embodiments, the window can be 4 nm in size, e.g., +/−2 nm on either side of 121.6 nm, or 8 nm in size, e.g., +/−4 nm on either side of 121.6 nm, etc. Additionally as shown above, several other local minima in the absorption coefficient of Oxygen occur at other wavelengths within the vacuum ultraviolet region proximate the Hydrogen Lyman-α line and so, in further embodiments, one or more light sources are employed to generate light at one or more of these other wavelengths in addition to or instead of at the wavelength of the Hydrogen Lyman-α line, and/or within windows about these wavelengths in addition to or instead of at the wavelength of the Hydrogen Lyman-α line.

The light generated within the interior 175 then proceeds out of the housing 125 by way of an optical window 178 located at the outer end of the first half 135 of the housing, after which it is directed toward the mirror 50 and ultimately to the objective lens 80. In the present embodiment, the optical window 178 is about 0.5 to about 5 mm in thickness, and is securely attached to the remainder of the housing 125, so as to effectively seal the interior 175 from regions exterior to the housing. Preferably, the optical window 178 is placed several centimeters from the discharge region 155 to prevent deterioration of window transmission from ion bombardment. Use of the window 178 makes it possible to control the gas pressure within the interior 175 and particularly within the discharge region 155, and prevents contamination from the light source 10 from entering the rest of the microscope.

Although the present embodiment shows the optical microscope 100 as including both the window 80 of the light source 10 and also the window 75 of the source module 60 of FIG. 1, it will be understood that in some sense the two windows are duplicative and, consequently, in alternate embodiments only one of those two windows will be present (for example, the source module 60 need not be sealed in some embodiments). With respect to the transmittive materials used as the optical windows 75 and 178 (and possibly for other components of the optical microscope 100 as well), high quality components can be fabricated from polished LiF or, alternatively, $MgF_2$. $CaF_2$ is a further possible alternative, but exhibits only poor transmission (e.g., less than 5%). Also, in some embodiments, two or more of these and/or other materials can be employed. In selecting among these materials, it can be noted that the theoretical absorption edge for LiF is approximately 105 nm, and for $MgF_2$ it is near 115 nm. $MgF_2$ is far less hygroscopic than LiF. In the embodiments described herein, including those of FIGS. 1 and 12, it is possible for one or more components to be made of one of the aforementioned materials (e.g., LiF) while one or more other components are made of another of the aforementioned materials (e.g., $MgF_2$).

Figure 11:
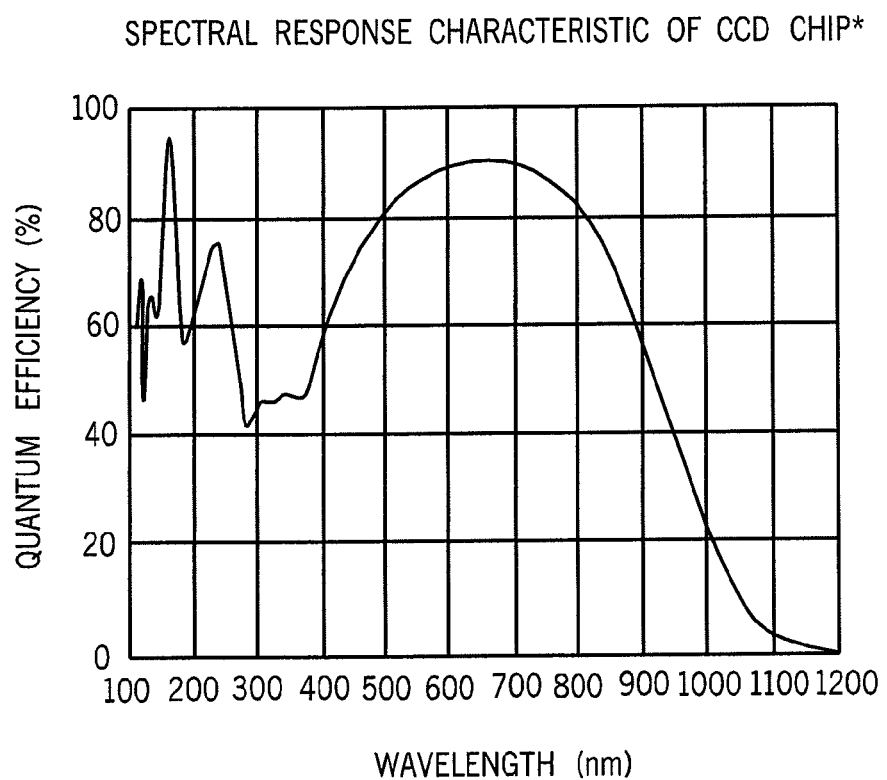
FIG. 11 shows a typical spectral response characteristic of a CCD chip, such as used in the Hamamatsu C8000-10 vacuum ultraviolet camera system, as can be employed in the optical microscope of FIG. 1 in one embodiment of the present invention.

As for the camera module 90, it can take a variety of forms depending upon the embodiment so long as the camera module is capable of receiving and sensing/detecting light at (and around) the Hydrogen Lyman-α line (e.g., at λ=121.6 nm) and generating images based thereupon. In at least some embodiments, the camera module 90 can be a charge coupled device (CCD) camera. For example, one exemplary CCD camera that is sensitive to light at the Hydrogen Lyman-α line and thus can be employed in certain embodiments as the camera module 90 is the Hamamatsu C8000-10, available from Hamamatsu Photonics K.K., of Hamamatsu City, Japan. That camera's spectral sensitivity is shown in FIG. 11. The pixel size of this camera is 14 μm, such that in at least some embodiments, the magnification of the camera module is 60. Also, in some embodiments, such a magnification can be achieved by altering the design of the Schwarzschild objective lens 80 slightly (yielding this magnification between the object and image), without adding any additional optical components.

Depending upon the embodiment, the camera module 90 is capable of a variety of imaging operations, image processing operations and other operations after receiving and sensing/detecting. In some embodiments, the camera module 90 records imaging information on film that is then processed externally by a third party, or more immediately by the camera module itself. In other embodiments, the camera module 90 stores imaging information on memory within or associated with the camera module. This imaging information can, in at least some embodiments, be stored digitally. Further, in some embodiments, the camera module is capable of performing various digital processing operations upon the imaging information, as well as capable of transmitting the processed (or unprocessed) imaging information to other devices (e.g., computer systems) associated with or remote from the camera module. Such transmission can occur, in at least some embodiments, by various network communication links or even via the internet or the World Wide Web, via hardwired or wireless communication links. In some embodiments, the camera module itself is capable of displaying (e.g., on a video screen or monitor) the images, and/or capable of printing hardcopies of images.

Figure 12:
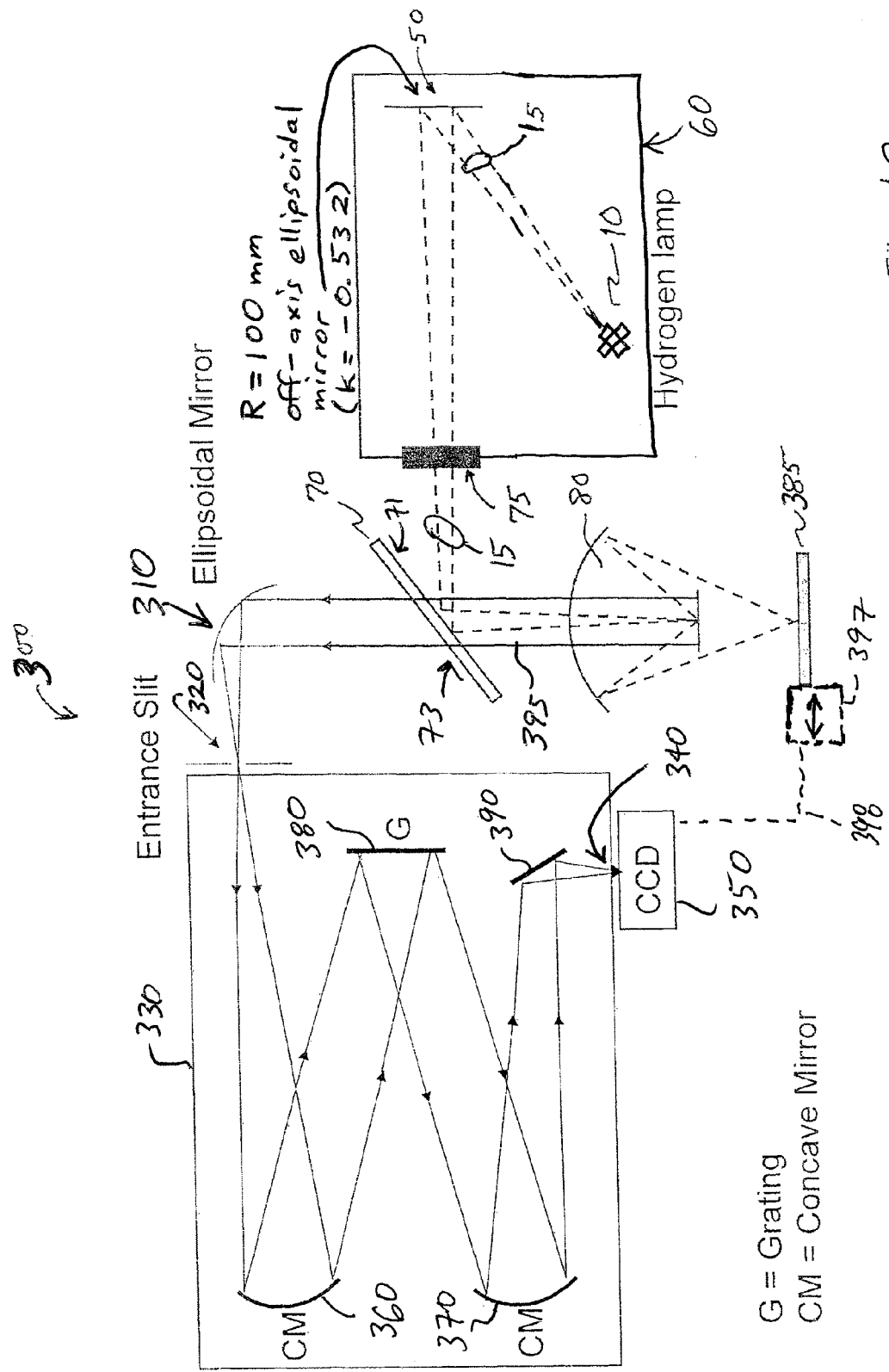
FIG. 12 shows, in simplified schematic form, exemplary components of a micro-Raman vacuum ultraviolet spectrometer (and associated optical path), in accordance with one embodiment of the present invention.

Turning to FIG. 12, in at least some embodiments the present invention also relates to spectroscopy systems and, more particularly, to Raman spectrometers that involve Raman scattering. FIG. 12 in particularly illustrates one exemplary Raman spectrometer 300 that more particularly can be termed a micro-Raman vacuum ultraviolet spectrometer. As will be discussed further below, the Raman spectrometer 300 can be employed to perform, among other things, ultra-high resolution mapping of material properties in thin films, substrates and semiconductors. As was the case with the optical microscope 100 discussed above, the Raman spectrometer 300 takes advantage of the natural coincidence that the Hydrogen Lyman-α line at 121.6 nm in the deep or vacuum ultraviolet region of the electromagnetic spectrum falls within the narrow, highly transparent "window" in the air absorption spectrum (also precisely at 121.6 nm), such that the Hydrogen Lyman-α line light can be effectively transmitted within the Raman spectrometer without the need to work in high vacuum. This enhanced ability to transmit this light within the Raman spectrometer without a high-vacuum light path significantly enhances the Raman micro-spectral analysis that is possible, in contrast with conventional spectrometers that employ visible or near-ultraviolet light.

As shown, the Raman spectrometer 300 in the present embodiment includes several of the same components as the optical microscope 100 of FIG. 1. In particular, the Raman spectrometer 300 (like the optical microscope 100) includes the source module 60 with the light source 10 that produces the light 15, the ellipsoidal mirror 50 that receives the light 15 from the light source 10 and reflects that light, and the optical window 75 through which passes the light 15 after being reflected off of the mirror 50. In at least one embodiment, the light source 10 is a microwave-driven gas-discharge light source employing Hydrogen (or Hydrogen/Helium) such as that shown in FIG. 9, and the light 15 generated by that light source is at (or within close range of) the Hydrogen Lyman-α line. Further, the Raman spectrometer 300 also includes the beam splitter 70 that receives the light after it passes through the optical window 75, and the objective lens 80 that, upon receiving the light 15 from the beam splitter, directs the light toward a target 385 (which can be, but need not be, the same as the target 85). The beam splitter 70 can again, depending upon the embodiment, have one or more films deposited along the surfaces 71 and/or 73, and such films can be manufactured from materials such as those discussed above (e.g., from LiF or $MgF_2$).

As was the case with the optical microscope 100, light reflected off of the target 385 that returns to the objective lens 80 is directed back to the beam splitter 70 by the objective lens as returning light 395 (the returning light 395 can be, but need not be, the same as the returning light 95 of FIG. 1, for example, if the target 85 is identical to the target 385). The returning light 395 in particular includes Raman scattered light. The returning light 395 again is collimated or substantially collimated (or, in alternate embodiments, is slightly converging) due to the operation of the objective lens 80. As with the returning light 95, the beam splitter 70 allows the returning light 395 to pass through it. In the present embodiment, the returning light 95 particularly includes scattered radiation.

Although sharing some of the same components as are found in the optical microscope 100, the Raman spectrometer has different components that receive and process the returning light 395 than those found in the optical microscope. More particularly as shown, the returning light 395, rather than proceeding immediately from the beam splitter 70 to a camera module as in the optical microscope 100, instead proceeds from the beam splitter to an ellipsoidal mirror 310 that reflects the returning light into an entrance slit 320 of a monochromator 330. It will be understood that, due to the Raman scattering that occurs at the target 385, the returning light 395 includes not only light components at the same wavelength as the light 15 from the light source 10 (e.g., light components with a wavelength of 121.6 nm corresponding to the Hydrogen Lyman-α line), but also wavelength-shifted (or frequency-shifted) light components as well. It is the wavelength-shifted light components that are of greatest interest in performing the Raman spectroscopy procedure. The monochromator 330 processes the returning light 395 in a manner by which the spectrum of the returning light is dispersed. As a result of this dispersion, the monochromator 330 in turn outputs processed light 340 that in particular includes the Raman shifted light components that are of primary interest.

Depending upon the embodiment, the particular contents of the processed light 340 can vary. In the present embodiment, the processed light 340 includes a Rayleigh scattered line and one or more Raman shifted line(s), including in at least some embodiments Stokes and anti-Stokes shifted Raman lines. That is, the processing of the returning light 395 by the monochromator 330 particularly involves dispersion of the Rayleigh scattered line and the Raman/Stokes shifted lines. Regardless of the particular contents of the processed light 340 exiting the monochromator 330, as shown in FIG. 12, the processed light 340 output by the monochromator in turn is received at a camera module 350. Although the camera module 350 can take a variety of forms depending upon the embodiment, in the present embodiment the camera module includes a CCD pixel array (thus the processed light spectrum is captured via the CCD pixel array). Ultimately, the illumination quality (e.g., the Kohler illumination) of the target 385 is not as important as the operation of the monochromator 330 and/or camera module 350 in achieving useful Raman spectroscopic results.

More particularly with respect to the monochromator 330, in the present embodiment the monochromator is a single-grating Czerny-Turner configured monochromator. As shown in FIG. 12, the monochromator 330 particularly includes first and second concave mirrors 360 and 370, respectively, as well as a diffraction grating 380 and a further planar mirror 390. In order to process the returning light 395 so as to output the processed light 340, the monochromator 330 first receives the returning light 395 through the entrance slit 320 and the returning light than arrives at the first concave mirror 360. The first concave mirror 360 reflects the returning light 395 toward the grating 380. The grating 380 services as a wavelength dispersive element to physically direct the Raman shifted wavelengths away from the source wavelength for ease in detection. After reaching the grating 380, the returning light 395 (or at least a portion thereof) is further reflected toward the second concave mirror 370, which reflects that light additionally toward the further mirror 390, which in turn reflects that light one more time so that the light proceeds out of the monochromator 330 as the processed light 340 and arrives at the camera module 350.

In addition to the above components, in at least some embodiments the Raman spectrometer 300 includes certain further components. As already noted, the returning light 395 includes not only light at the Hydrogen Lyman-α line, but also Raman shifted light components that are of greater interest from the standpoint of performing Raman spectroscopy measurements. Because Hydrogen Lyman-α line light is of lesser (or no) interest, and because the presence of Hydrogen Lyman-α line light in the monochromator 330 can create noise in the monochromator, in some embodiments it is desirable to remove or reduce the amount of light at the Hydrogen Lyman-α line prior to that light entering the monochromator. Such removal or reduction in the Hydrogen Lyman-α line light can be achieved, for example, by providing a source wavelength filter upstream of the monochromator 330 to block some or all of the light at the Hydrogen Lyman-α line. This source wavelength filter can also be considered a prefilter. In one such exemplary embodiment, this filter can take the form of an additional diffraction grating that is mounted on, and can be considered part of, the ellipsoidal mirror 310.

In yet additional embodiments, the Raman spectrometer 300 can further include one or more source or field apertures (or comparable structures) to limit the spatial degrees of freedom as pertain to the light directed on the target 385. By appropriately limiting the spatial degrees of freedom, the target 385 can be interrogated in a specific manner, for example, by either a spot or a line. One or more of such source or field apertures can be provided at a variety of locations within the Raman spectrometer 300 depending upon the embodiment. For example, one such aperture can be a source aperture placed at the light source 10 that restricts the light emanating from the light source. Another such aperture can be formed at or as part of the window 75, and/or formed in a Kohler or critical illumination scheme. In yet another embodiment there can be provided a confocal arrangement of slits/holes placed either upstream or downstream of the beam splitter 70. In still a further embodiment, for example, critical illumination can include two slits, one at the light source 10 and one at the entrance slit 320 of the monochromator 330.

The operation of the monochromator 330 interposed between the objective lens assembly (that is, the combination of the objective lens 80, the beam splitter 70, and the ellipsoidal mirror 310) and the camera module 350 (CCD detector array) allows for measurement of the Raman shift due to stress in the material of interest constituting (or existing as part of) the target 385. The Raman shifted signal generally can be considered an "average" of the illuminated volume: spot size and penetration depth with respect to the particular portion of the target 385 at which the light 15 is directed by the objective lens 80 at any given time. In order for the Raman spectrometer 300 to provide desired operation and output the desired processed light 340 to allow for such measurement of the Raman shift, the monochromator 330 in the present embodiment has sufficient resolution to measure displacement of a Stokes shifted line from a Rayleigh line. Additionally, there exists an option to observe the Raman spectrum in higher order on the grating 380 (e.g., $4^{th}$ order or higher, and/or through the use of an Echelle grating).

Although the monochromator 330 in the present embodiment is a single-grating Czerny-Turner monochromator, in alternate embodiments other types of monochromators can be employed. For example, in some other embodiments, a double-grating Czerny-Turner monochromator can be employed. The double-grating Czerny-Turner monochromator is similar to the single-grating Czerny-Turner monochromator 330 in that it receives light through an entrance slit such as the entrance slit 320 that in turn is directed to and reflected by a first grouping of two concave mirrors and a grating such as the mirrors 360, 370 and grating 380. However, in the double-grating Czerny-Turner monochromator, there is not merely a first grouping of two concave mirrors and grating corresponding to the concave mirrors 360, 370 and grating 380 of FIG. 12, but also a second such grouping of two concave mirrors and a grating. By contrast with the arrangement of FIG. 12, light reflected from the first grouping (that is, light reflected off of the concave mirror 370 of the first grouping) is reflected toward an intermediate concave mirror that in turn reflects that light toward the second grouping (more particularly, to the first of the two concave mirrors of that grouping corresponding to the concave mirror 360). Upon arriving at the second grouping, the light is again reflected from the first concave mirror, to the grating, and then to the second concave mirror of that grouping. The light reflected off of that second concave mirror of that grouping then is directed to a further planar mirror corresponding to the further planar mirror 390 of the single-grating monochromator 330, which reflects the light out of the monochromator. By virtue of its additional components, the double-grating Czerny-Turner monochromator provides greater dispersion than the single-grating Czerny-Turner monochromator. It can be further noted that, when a double-grating Czerny-Turner monochromator is employed, a prefilter (or further grating) such as that discussed above as being provided on the ellipsoidal mirror 310, need not necessarily be employed.

For example, the Ebert monochromator configuration is a viable alternative, as is the more compact Wadsworth mounting using a concave grating. Although a variety of different types of camera modules and/or other light sensing devices can be employed depending upon the embodiment, in the embodiment of FIG. 12 (as was the case with the optical microscope 100 of FIG. 1) the camera module 350 is designed to work at and is capable of sensing light at $\lambda$=121.6 nm, and the camera module more particularly can be the Hamamatsu C8000-10, the spectral response characteristic of which is shown in FIG. 11. Given the use of the Hydrogen Lyman-$\alpha$ line light in the Raman spectrometer 300, it is not necessary for the Raman spectrometer to operated in a vacuum or near-vacuum to prevent light absorption as the light proceeds through the air from the light source 10 to the target 385 and ultimately to the camera module 350. That said, in some embodiments, some or all of the path of the Raman scattered radiation proceeding from the target 385 to the camera module 350 is partially evacuated or purged by an inert gas such as Argon.

In use, during a stress measurement mode (e.g., to detect stress placed upon the target 385), the Raman spectrometer 300 operates as follows. First, before the providing of any light from the light source 10 at the Hydrogen Lyman-$\alpha$ line, an operator will first locate the feature of interest (e.g., the target 385 or a portion thereof) using a visible light source (e.g., 400 nm <$\lambda$<700 nm), which is not shown in FIG. 12. Upon locating the feature of interest, the operator then switches on the light source 10 (and switches off the visible light source). At that point, the light 15 is directed from the light source 10 to the target 385 by way of the mirror 50, beam splitter 70, and objective lens 80, which in turn results in the providing of the returning light 395 from the target to the ellipsoidal mirror 310, monochromator 330 and ultimately the camera module 350. The operator then is able to view a high resolution image obtained by way of the camera module 350 on a video display monitor, which can be considered to form part of the camera module or alternatively be separate from it (e.g.; in the form of a personal computer coupled to the camera module by way of a dedicated communication link, a network link, the Internet, wireless communications, or otherwise). Also, the images can be printed in hardcopy form by way of the camera module 350 (e.g., by way of a printer connected to or forming part of the camera module) or otherwise.

It should further be understood that, although the Raman spectrometer 300 is capable of being used to measure characteristics (or otherwise probe) specific small volume regions on a target on an individual basis, in many circumstances it will be desired that the Raman spectrometer measure characteristics over (or otherwise probe) an entire target/sample, or with respect to a large section of a target/sample that encompasses many such small volume regions. To perform Raman spectroscopy over such a larger region, for example over a large two-dimensional region of a target/sample, in many embodiments the Raman spectrometer 300 is operated in a scanning mode where Raman spectroscopic measurements are obtained in relation to numerous volume regions on a given target. Such scanning can be achieved in at least some embodiments by mounting or supporting a target of interest upon a movable platform. For example, as illustrated in FIG. 12 in phantom, a motorized support platform 397 can be used to support and move the target 385 so that different volume portions of the target are exposed to the light 15 and thus reflected Raman scattered light can be received from each of those different volume portions. In some cases, as represented by a communication linkage 398, the motorized support platform 397 operation is controlled by the camera module 350, such that it is possible to coordinate image data received by the camera module 350 with the movement of the platform 397 so as to generate an overall scanned image representative of the characteristics of numerous portions of the target 385. In still other embodiments, other mechanisms or techniques can be employed to allow for scanning of multiple regions of a target. For example, in some other embodiments, mechanisms can be employed that allow for movement of the objective lens relative to the target.

Notwithstanding the above discussion regarding the Raman spectrometer 300 of FIG. 12, it should be understood that the present invention is intended to encompass a variety of different embodiments of Raman spectrometers having a variety of features other than those specifically shown in and discussed with respect to FIG. 12. Among other things, for example, any of the various alternate embodiments discussed above in relation to the optical microscope 100 pertaining to the light source 10 (and/or source module 60), the objective lens 80, and the various other optical components employed for transmission and reflection of light to and from those devices (e.g., the beam splitter 70 and the mirror 50) can equally be employed in alternate embodiments of the Raman spectrometer 300. Further for example, in this regard, although FIG. 12 shows the use of the objective lens 80 of FIG. 1 in the Raman spectrometer 300, in other embodiments a variety of other objective lenses and/or other lens devices can be used including, for example, any of the lenses shown in FIGS. 5A, 5B and 6 discussed above. In one such example, the objective lens 80 can be replaced with a solid immersion lens to provide a spatial resolution <50 nm. Also for example, as already noted above in relation to the optical microscope 100, in alternate embodiments of the Raman spectrometer 300 it is not necessary to utilize a visible light source at all, but rather the use of visible emissions from a Hydrogen/Helium discharge will obviate the need for a separate visible light source.

Further, the present invention is intended to encompass a variety of embodiments that use any of a variety of different types of light sources to generate the Hydrogen Lyman-$\alpha$ light. Although the light sources can be microwave light sources in some embodiments, in other embodiments the light sources need not be microwave sources. It should further be noted in this regard that an evaluation has been conducted to verify that the Raman spectrometer 300 design of FIG. 12 can be used for Raman spectroscopy when employing a commercially-available pulsed Hydrogen Lyman-α light source that is different than the particular light source 10 (or source module 60) shown in FIG. 12, namely, the High Brightness VUV (Vacuum Ultraviolet) Lamp available from UV Solutions Inc. of Newark, N.J. (which uses a PS-100-110/240 power source). In particular, it has been determined that this commercially-available Hydrogen Lyman-α light source indeed has adequate brightness to allow for Raman spectroscopy measurements. According to the present evaluation, to achieve desired results using this light source in the Raman spectrometer 300 of FIG. 12 (in place of the light source 10 shown therein), the camera module 350 will take about 26 seconds of exposure time to capture Raman spectrum with signal to noise ratio of 100 to 1. By comparison, in another embodiment of Raman spectrometer using a double-grating Czerny-Turner monochromator (as also discussed above) rather than a single-grating Czerny-Turner monochromator as shown in FIG. 12, it has been determined that the camera module takes about 4 minutes of exposure to capture the Raman spectrum with the same signal to noise ratio. Although in this second embodiment (employing the double-grating Czerny-Turner monochromator) the camera module takes longer time to capture the Raman spectrum than in the first embodiment (employing the monochromator 330), in some circumstances the second embodiment can better isolate the Raman spectrum and reflected light.

Given its usage of H Lyman-α light, the Raman spectrometer 300 (and other Raman spectrometer embodiments envisioned herewithin) achieves several advantages by comparison with conventional spectrometers that employ Raman scattering. In particular, because H Lyman-α light is employed, the Raman spectrometer 300 can achieve much smaller spot sizes, and have minimum penetration into the target 385 (e.g., a film, substrate, etc.). Further, the Raman spectrometer 300 can significantly enhance the scattering intensity of the Raman Stokes line relative to conventional spectrometers that employ Raman scattering. Generally speaking, Raman spectrometers in accordance with embodiments of the present invention such as the Raman spectrometer 300 provide significantly improved performance relative to conventional Raman spectrometers in their ability to yield sub-micron profiling, with high spatial resolution and high efficiency. The Raman spectrometers in accordance with at least some embodiments of the present invention are able to take advantage of the strong dependence of focus spot size and penetration depth on wavelength, as well as the $\lambda^{-4}$ enhancement in intensity of the Raman scattered signal.

For example, by comparison with some conventional Raman spectrometers, Raman spectrometers in accordance with at least some embodiments of the present invention can achieve a many-fold decrease in spot size. For example, in some embodiments, the objective lens focuses the atomic Hydrogen resonance radiation on the surface of the sample of interest to a spot size whose area is about 20 or even about 25 times smaller than the spot size produced by Raman spectrometers which typically use a 532 nm laser for Raman excitation. Also for example, in at least some embodiments, Raman spectrometers in accordance with embodiments of the present invention can be used to measure features/properties of a target within the top ~6 nm of the target (e.g., less than 6 nm penetration depth into a film or substrates), thus providing a "true" surface characterization. In this regard, the use of the Hydrogen Lyman-α line (121.6 nm) light particularly facilitates that the volume contributing to the Raman scattering remains within the top 6 nm thickness of the target, which allows probing shallow active layers without any interference from under-layers or substrates. The scattering intensity of the Raman lines that can be achieved by at least some Raman spectrometers in accordance with the present invention can be more than 350 times higher than the scattering intensities achievable using conventional 532 nm line excitation.

Among other things, it is envisioned that the Raman spectrometers in accordance with embodiments of the present invention can be used for any of a variety of applications, to measure any of a variety of features and/or characteristics in a variety of types of targets such as thin films, various material substrates, and semiconductors. Among other things, it also is envisioned that the Raman spectrometers in accordance with embodiments of the present invention can be used to obtain information about a variety of types of characteristics including, for example, mechanical stress, composition, chemistry, chemical composition (e.g., SiGe films), morphology, impurity content, doping level, temperature, phonon frequencies, and/or energies of electronic states. Information about mechanical stress and morphology in particular can be obtained from the position and line width of the Raman shifted mode. The relative intensities of various Raman shifted modes provide information about chemical composition and morphology. Information about carrier concentration can be derived from phonon-plasmon coupled modes in Raman spectrum. The relative intensity of Stokes and anti-Stokes Raman shifted peaks gives a precise measurement of temperature.

As already noted above, information regarding such characteristics can be of interest for a variety of reasons. For example, mechanical stress can adversely affect the functioning and reliability of microelectronic devices, micro-electro-mechanical systems (MEMS), and nanostructures. Stress in films can cause changes in electron or hole mobility, current leakage, dislocations near silicide lines, cracks in chips, fractures in MEMS, breaking of solder bumps, stress migration, etc. Raman spectrometry is particularly applicable, among other things, to probing single crystal Silicon structures, where the Raman shift is about 520 $cm^{-1}$. Some other important materials that exhibit Raman active modes are SiGe, InGaAs, GaAs, AlGaAs, GaN, and many others as discussed, for example, in "Raman Spectroscopy: About Chips and Stress" *Spectroscopy Europe,* 15, (2003) pp. 6-13, which is hereby incorporated by reference herein.

From the discussion provided above, it should be evident that embodiments of the present invention, by utilizing light at (or near) the Hydrogen Lyman-α line, are capable of allowing high-resolution optical microscopy and/or Raman spectroscopy, without the need for a high vacuum light path between the light source, the camera and the target. The present invention is intended to encompass a wide variety of structures, components, and methods of operation (and construction) of optical microscopes and/or Raman spectroscopy systems capable of operating at (or near) the Hydrogen Lyman-α line that differ from the particular embodiments described above, which are merely intended to be exemplary. For example, while the above embodiments particularly envision the use of Hydrogen gas, Deuterium is equally applicable in at least some embodiment of the present invention. Also for example, while in the embodiments of FIGS. 1 and 12 each of the objective lenses 80, 380 not only communicates light to the respective target 85, 385 but also communicates reflected light away from the respective target 85, 385, in alternate embodiments two different lens devices (or other devices) could be employed to perform these two different operations, respectively.

Embodiments of the present invention can be employed in relation to a variety of different applications. For example, optical microscopes and/or Raman spectrometers in accordance with the present invention can be utilized in examining semiconductor wafers, biological (e.g., cellular/tissue) specimens, or optical recording surfaces, as well as in the research and development of MEMS (microelectromechanical systems), various metallurgical applications, and the fabrication of various nanostructures for electronics and medical diagnostics. Additionally, embodiments of the present invention also include other systems and methods that include one or more optical microscopes or one or more optical spectroscopy systems, or perform operations involving optical microscopy or optical spectroscopy.

Although various embodiments which incorporate the teachings of the present invention have been shown and described in detail herein, those skilled in the art can readily devise many other varied embodiments that still incorporate these teachings. That is, it is specifically intended that the present invention not be limited to the embodiments and illustrations contained herein, but include modified forms of those embodiments including portions of the embodiments and combinations of elements of different embodiments as come within the scope of the following claims.

We claim:

1. An apparatus comprising:
a deep ultraviolet light source configured to generate light having a wavelength within a window in the deep ultraviolet region of the electromagnetic spectrum within which a local minimum in the absorption coefficient of Oxygen occurs, wherein the wavelength is approximately 121.6 nm;
a lens device that receives a first portion of the generated light, directs at least some of the first portion of the generated light toward a target location, receives reflected light from the target location, and directs the reflected light toward a further location, wherein a light path between the light source and the target location is other than at a high vacuum; and
a camera device that is positioned at one of the further location and an additional location, wherein the camera device receives a first amount of the reflected light,
whereby an image is generated by the camera device based upon the first amount of the reflected light.

2. An apparatus comprising:
a deep ultraviolet light source configured to generate light having a wavelength within a window in the deep ultraviolet region of the electromagnetic spectrum within which a local minimum in the absorption coefficient of Oxygen occurs, wherein the wavelength is approximately 121.6 nm,
a lens device that receives a first portion of the generated light, directs at least some of the first portion of the generated light toward a target location, receives reflected light from the target location, and directs the reflected light toward a further location, wherein a light path between the light source and the target location is other than at a high vacuum; and
a camera device that is positioned at one of the further location and an additional location, wherein the camera device receives a first amount of the reflected light,
wherein the apparatus is a Raman spectrometer,
whereby an image is generated by the camera device based upon the first amount of the reflected light.

3. The apparatus of claim 2, wherein the reflected light includes Raman scattered light.

4. The apparatus of claim 2, wherein the apparatus further includes a monochromator positioned to receive at least some of the reflected light and to output the first amount of the reflected light for receipt by the camera device.

5. The apparatus of claim 4, wherein the first amount of the reflected light includes a Raman shifted line.

6. The apparatus of claim 5, wherein the first amount of the reflected light includes at least one of a Rayleigh scattered line, an additional Raman shifted line, a Stokes shifted Raman line, and an anti-Stokes shifted Raman line.

7. The apparatus of claim 4, wherein the monochromator includes a grating that causes dispersion of the at least some of the reflected light.

8. The apparatus of claim 7, wherein the monochromator further includes an entrance slit through which the at least some of the reflected light passes as it is received by the monochromator, and a first concave mirror that reflects the at least some of the reflected light toward the grating.

9. The apparatus of claim 8, wherein the first amount of the reflected light that is output by the monochromator is, prior to being output, transmitted from the grating to a second concave mirror, reflected by the second concave mirror toward an additional mirror, and further reflected by the additional mirror.

10. The apparatus of claim 4, further comprising an ellipsoidal mirror at the further location that receives the reflected light and directs the reflected light to the monochromator, wherein the camera device is at the additional location.

11. The apparatus of claim 10, wherein the ellipsoidal mirror includes a grating that filters out at least some of a light component of the reflected light that is at the wavelength.

12. The apparatus of claim 2, wherein an absorption coefficient of Oxygen at standard temperature and pressure that corresponds to the wavelength is less than 25 $atm^{-1}cm^{-1}$.

13. The apparatus of claim 2, wherein the window is one of approximately 1 nm in width, approximately 2 nm in width, approximately 4 nm in width, and approximately 8 nm in width.

14. The apparatus of claim 2, wherein the wavelength corresponds to one or both of the Hydrogen Lyman-α line and the Deuterium Lyman-α line.

15. The apparatus of claim 2, further comprising a beam splitter positioned between at least two of the light source, the lens device and the camera device.

16. The apparatus of claim 15, wherein the beam splitter has at least one substantially planar surface, wherein the beam splitter includes at least one surface upon which is provided a coating layer, wherein the beam splitter is positioned between the lens device and each of the light source and the camera device, wherein the beam splitter receives the generated light from the deep ultraviolet light source, wherein the beam splitter reflects the first portion of the generated light toward the lens device, wherein the beam splitter receives the reflected light, and wherein the beam splitter further transmits the reflected light to the further location.

17. The apparatus of claim 2, wherein the lens device is an objective lens device that focuses at least some of the first portion of the generated light toward the target location, and includes one or more of (a) a compound lens device that includes at least first and second mirrors, (b) a Schwartzschild lens device having first and second mirrors each of which is a spherical-type mirror, and (c) and a solid immersion lens device.

18. The apparatus of claim 2, wherein the light source includes a microwave source that supplies microwave energy to a microwave cavity.

19. The apparatus of claim 18, wherein the at least some of the first portion of the generated light directed toward the target location is restricted in at least one spatial degree of freedom by at least one additional aperture associated with the light source or a portion of the apparatus downstream of the light source.

20. The apparatus of claim 18, wherein the microwave source one or more of (a) includes a Gunn diode, (b) receives a mixture of Hydrogen and Helium into an interior region within a housing of the microwave source, or (c) operates by way of a microwave excitation of at least one of Hydrogen and Deuterium.

21. The apparatus of claim 2, wherein the camera device performs digital image processing based upon the first amount of the reflected light received by the camera device.

22. The Raman spectrometer of claim 2 wherein the image generated by the camera device is based upon a plurality of reflected light portions including the first amount of the reflected light, and wherein the respective reflected light portions correspond to different volumetric portions of a target item probed respectively at different times during a scanning operation.

23. A semiconductor manufacturing system comprising the apparatus of claim 2.

24. A Raman spectrometer comprising:
  a vacuum ultraviolet light source configured to generate light having a wavelength within a window in the vacuum ultraviolet region of the electromagnetic spectrum within which a local minimum in the absorption coefficient of Oxygen occurs, wherein the wavelength is approximately 121.6 nm;
  a lens device that receives a first portion of the generated light, directs at least some of the first portion of the generated light toward a target location, receives reflected light from the target location, and directs the reflected light toward a further location, wherein a light path between the light source and the target location is other than at a high vacuum, and wherein a region within a housing of the light source experiences a sub-atmospheric pressure and is substantially sealed off from an outside atmosphere at least in part by way of an optical window structure through which the first portion of the generated light passes prior to being received by the lens device;
  a dispersive device that receives at least some of the reflected light and outputs dispersed light produced based thereupon; and
  a camera module that is positioned at additional location, wherein the camera module receives at least some of the dispersed light,
  whereby an image is generated by the camera device based upon the at least some of the dispersed light.

25. The Raman spectrometer of claim 24, wherein the dispersive device includes a monochromator having a diffraction grating.

26. A method of performing Raman spectroscopy, the method comprising:
  generating light at a light source, wherein a wavelength of the generated light is within a window in the deep ultraviolet region of the electromagnetic spectrum within which a local minimum in the absorption coefficient of Oxygen occurs, the window being at least one of about 1.0 nm and about 2.0 nm in width, wherein the wavelength is approximately 121.6 nm;
  transmitting the generated light to a target location by way of an optical window structure of the light source and at least one lens device, wherein the optical window structure substantially seals off, from an outside atmosphere, a region within a housing of the light source that experiences a sub-atmospheric pressure, and wherein a light path between the light source and the target location is other than at a high vacuum;
  communicating reflected light received from the target location to a further location, wherein at least a portion of the reflected light is at the wavelength and occurs in response to the transmitting of the generated light to the target location;
  dispersing at least some of the reflected light into multiple light components; and
  producing an image based upon at least some of the multiple light components.

27. The method of claim 26, wherein the image is representative of at least one exterior feature of a target item positioned at the target location, the exterior feature having a surface area, and further comprising processing information corresponding to the reflected light so as to arrive at the image.

28. The Raman spectrometer of claim 2, wherein a region within a housing of the light source experiences a sub-atmospheric pressure and is substantially sealed off from an outside atmosphere at least in part by way of an optical window structure through which the first portion of the generated light passes prior to being received by the lens device.

29. The Raman spectrometer of claim 28, wherein the optical window structure is made from at least one of LiF, $MgF_2$ and $CaF_2$, and
  wherein the apparatus further comprises a pump coupled to the light source to control and regulate the sub-atmospheric pressure in the housing.

30. The Raman spectrometer of claim 28, wherein the wavelength corresponds to an atomic emission line.

* * * * *